US012486748B2

(12) United States Patent
Aune et al.

(10) Patent No.: US 12,486,748 B2
(45) Date of Patent: Dec. 2, 2025

(54) HYBRID OILFIELD PUMPING SYSTEM

(71) Applicant: Liberty Oilfield Services LLC, Denver, CO (US)

(72) Inventors: Roy Aune, Golden, CO (US); Zack Thornton, Piedmont, OK (US); Kirk Fiscus, Denver, CO (US)

(*) Notice: Subject to any disclaimer, the term of this patent is extended or adjusted under 35 U.S.C. 154(b) by 167 days.

(21) Appl. No.: 18/307,340

(22) Filed: Apr. 26, 2023

(65) Prior Publication Data

US 2023/0340866 A1 Oct. 26, 2023

Related U.S. Application Data

(60) Provisional application No. 63/363,622, filed on Apr. 26, 2022.

(51) Int. Cl.
*E21B 43/26* (2006.01)
*F04B 17/05* (2006.01)

(52) U.S. Cl.
CPC .......... *E21B 43/2607* (2020.05); *F04B 17/05* (2013.01)

(58) Field of Classification Search
CPC .... E21B 43/26; E21B 43/2607; E21B 33/068; F04B 17/05; F04B 43/18; F04B 53/10; F04B 19/22
USPC .......................................................... 166/308.1
See application file for complete search history.

(56) References Cited

U.S. PATENT DOCUMENTS

| | | | | |
|---|---|---|---|---|
| 3,200,590 | A * | 8/1965 | Summerlin | F16H 61/4035 60/416 |
| 4,541,243 | A * | 9/1985 | Clark | F15B 3/00 60/595 |
| 5,133,624 | A | 7/1992 | Cahill | |
| 6,230,683 | B1 | 5/2001 | zur Loye et al. | |
| 7,798,124 | B2 | 9/2010 | Barrett et al. | |
| 9,534,473 | B2 * | 1/2017 | Morris | F01D 15/10 |
| 9,587,649 | B2 | 3/2017 | Oehring | |
| 9,850,805 | B2 | 12/2017 | Sotiropoulou et al. | |
| 10,741,158 | B1 | 8/2020 | Aune | |
| 10,781,803 | B2 | 9/2020 | Kumar et al. | |

(Continued)

OTHER PUBLICATIONS

Office Action for Canadian Patent Application No. 3,197,956 issued by the Canadian Patent Office, dated Nov. 19, 2024. (8 pgs.).

*Primary Examiner* — Nicole Coy
*Assistant Examiner* — Douglas S Wood
(74) *Attorney, Agent, or Firm* — Haynes and Boone, LLP; Randall C. Brown

(57) ABSTRACT

Oilfield pumping systems are improved by the incorporation of a reciprocating gas engine having a mode of operation that seeks to maintain a constant engine speed or rotational velocity. A driveline including a transmission with shiftable gears connects the reciprocating gas engine with a hydraulic pump configured for use in oilfield hydraulic fracturing operations. A control system is configured with programmatic instructions for operating a dual electric machine that alters torque emanating from the reciprocating gas engine to facilitate upshifting of gears in the transmission. This may be done by preloading the reciprocating gas engine with reverse or negative torque operating against that emanating from the reciprocating gas engine prior to the upshifting of gears, and/or by providing positive torque to assist that of the reciprocating gas engine after the upshifting of gears.

13 Claims, 14 Drawing Sheets

(56) References Cited

U.S. PATENT DOCUMENTS

| | | | | |
|---|---|---|---|---|
| 10,914,155 | B2 * | 2/2021 | Oehring | B01D 46/003 |
| 10,989,188 | B2 * | 4/2021 | Surjaatmadja | F04B 7/04 |
| 11,391,269 | B2 | 7/2022 | Tanner | |
| 2008/0115770 | A1 * | 5/2008 | Merchant | F02M 63/0225 417/364 |
| 2016/0177945 | A1 | 6/2016 | Byrne et al. | |
| 2017/0370831 | A1 | 12/2017 | Kojima et al. | |
| 2019/0178235 | A1 * | 6/2019 | Coskrey | F04B 17/03 |
| 2020/0040878 | A1 * | 2/2020 | Morris | E21B 43/2607 |
| 2020/0088202 | A1 * | 3/2020 | Sigmar | E21B 43/26 |
| 2021/0025385 | A1 * | 1/2021 | Surjaatmadja | E21B 41/00 |
| 2022/0298906 | A1 * | 9/2022 | Zhong | E21B 43/2607 |
| 2022/0372857 | A1 * | 11/2022 | Yeung | F04B 1/04 |

* cited by examiner

| PLUNGER DIAMETER | | DISPLACEMENT PER REVOLUTION | | DISPLACEMENT @PUMP RPM - INTERMITTENT SERVICE | | | | | | | | | | | | | | | | | | | |
|---|---|---|---|---|---|---|---|---|---|---|---|---|---|---|---|---|---|---|---|---|---|---|---|
| | | | | 7.525:1 INPUT SPEED | | 11.232:1 INPUT SPEED | | 7.525:1 INPUT SPEED | | 11.232:1 INPUT SPEED | | 7.525:1 INPUT SPEED | | 11.232:1 INPUT SPEED | | 7.525:1 INPUT SPEED | | 11.232:1 INPUT SPEED | | 7.525:1 INPUT SPEED | | 11.232:1 INPUT SPEED | |
| | | | | 376 | | 562 | | 753 | | 1123 | | 1505 | | 2246 | | 1881 | | 2808 | | 2258 | | 3370 | |
| | | | | 50 | | | | 100 | | | | 200 | | | | 250 | | | | 300 | | | |
| in. | mm. | Gallons | $m^3$ | GPM | $m^3/hr$ | PSI | bar | GPM | $m^3/hr$ | PSI | bar | GPM | $m^3/hr$ | PSI | bar | GPM | $m^3/hr$ | PSI | bar | GPM | $m^3/hr$ | PSI | bar |
| 4 | 102 | 2.992 | 0.0113 | 150 | 34 | 19894 | 1372 | 299 | 68 | 19894 | 1372 | 598 | 136 | 12889 | 889 | 748 | 170 | 10312 | 711 | 898 | 204 | 8593 | 592 |
| 4.5 | 114 | 3.787 | 0.0143 | 189 | 43 | 15719 | 1084 | 379 | 86 | 15719 | 1084 | 757 | 172 | 10184 | 702 | 947 | 215 | 8147 | 562 | 1136 | 258 | 6789 | 468 |
| 5 | 127 | 4.675 | 0.0177 | 234 | 53 | 12732 | 878 | 467 | 106 | 12732 | 878 | 935 | 212 | 8249 | 569 | 1169 | 265 | 6599 | 455 | 1402 | 319 | 5499 | 379 |
| 5.5 | 140 | 5.657 | 0.0214 | 283 | 64 | 10523 | 725 | 566 | 128 | 10523 | 725 | 1131 | 257 | 6818 | 470 | 1414 | 321 | 5454 | 376 | 1697 | 385 | 4545 | 313 |
| 5.75 | 146 | 6.183 | 0.0234 | 309 | 70 | 9628 | 664 | 618 | 140 | 9628 | 664 | 1237 | 281 | 6238 | 430 | 1546 | 351 | 4990 | 344 | 1855 | 421 | 4158 | 287 |
| 6 | 152 | 6.732 | 0.0255 | 337 | 76 | 8842 | 610 | 673 | 153 | 8842 | 610 | 1346 | 306 | 5729 | 395 | 1683 | 382 | 4583 | 316 | 2020 | 459 | 3819 | 263 |
| 6.5 | 165 | 7.901 | 0.0299 | 395 | 90 | 7534 | 519 | 790 | 179 | 7534 | 519 | 1580 | 359 | 4881 | 337 | 1975 | 449 | 3905 | 269 | 2370 | 538 | 3254 | 224 |

FIG. 11
(PRIOR ART)

1520
UPPER LIMIT
TARGET SPEED
1500
E
LOWER LIMIT
1480
F
G
τ
RPM
$t_1$
$t_2$
t

HYBRID OILFIELD PUMPING SYSTEM

CROSS-REFERENCE TO RELATED APPLICATIONS

This application claims priority to U.S. Provisional Application No. 63/363,622 filed Apr. 26, 2022, entitled "Hybrid Oilfield Pump With Magnetic Drive," the disclosure of which is hereby incorporated by reference in its entirety.

BACKGROUND

Field of the Invention

The presently disclosed instrumentalities pertain to the field of oilfield pumping equipment and, particularly, pumps used in support of well stimulation work such as hydraulic fracturing operations.

Description of the Related Art

Hydraulic fracturing is a well-known well stimulation technique in which pressurized liquid is utilized to fracture rock in a subterranean reservoir. In the usual case, this liquid is primarily water that contains sand or other proppants intended to hold open fractures which form during this process. The resulting "frac fluid" may sometimes benefit from the use of thickening agents, but these fluids are increasingly water-based. Originating in the year 1947, use of fracturing technology has grown such that approximately 2.5 million hydraulic fracturing operations had been performed worldwide by 2012. The use of hydraulic fracturing is increasing. Massive hydraulic fracturing operations in shale reservoirs now routinely consume millions of pounds of sand. Hydraulic fracturing makes it possible to drill commercially viable oil and gas wells in formations that were previously understood to be commercially unviable. Other applications for hydraulic fracturing include injection wells, geothermal wells, and water wells.

Various pumps are used to pump the frac fluids downhole under pressure. U.S. Pat. No. 10,781,803 to Kumar et al. and Publication No. US 2016/0177945 to Byrne et al. each describe, in exemplary fashion, multi-plunger pumps having a power end that drives a fluid end that is utilized to move oilfield fluids. The power ends may be operably coupled to a gear reduction transmission that is, in turn, powered by a diesel engine.

Hydraulic fracturing operations are increasingly regulated for noise and particulate emissions. Large jobs may require a fleet of trucks to pump millions of pounds of sand over a period of days or weeks. Where the traditional fleets are primarily diesel powered, diesel soot and noise associated with these operations in proximity to residential areas may incur legal or regulatory consequences. Thus, for example, some cities or states have established required setback distances separating wellsite locations from residential areas, and in some cases these setbacks are sufficiently large to interfere with wellsite operations.

Certain patent publications address these problems. U.S. Pat. No. 10,741,158 to Aune, which is hereby incorporated by reference to the same extent as though fully replicated herein, significantly advances the art by providing paneled enclosures to reduce noise emissions from the engines and pumps used in support of hydraulic fracturing operations.

Further noise reductions could be achieved, for example, using quieter engines. U.S. Pat. No. 9,587,649 to Oehring proposes a noise reduction system that includes, in part, the use of variable frequency drive ("VFD") electric motors to drive the pumps. This use of VFD motors as proposed by Oehring is, however, impractical in the field. The setup of such systems is complicated by having to run power lines and communication lines between different vehicles and a common control system when the hydraulic fracturing environment is already complex because it is crowded with heavy equipment. Setup times for the described system may be increased to unacceptable levels, and system reliability may diminish because the use of VFD technology is regarded by many as introducing multiple additional points of possible failure. Moreover, the VFD motors do not generate their own electricity, and the addition of generating capacity at remote wellsite locations as described in the aforementioned patent to Oehring can materially increase the areal footprint of a hydraulic fracturing operation.

U.S. Pat. No. 6,230,683 to zur Loye et al., U.S. Pat. No. 7,798,124 to Barrett et al., and U.S. Pat. No. 9,850,805 to Sotiropoulou et al., each of which is hereby incorporated by reference to the same extent as though fully replicated herein, describe reciprocating gas engines in a class that is conventionally utilized to generate electricity. These engines may be described as piston-cylinder engines having a relatively low compression ratio because the engines are designed to run for the generation of electricity at a constant rpm using only natural gas fuel. Many such engines run on a diesel principle, but others may be ignited by a spark plug or laser. In this class of engine as implemented for high horsepower applications, the fuel energy to power conversion efficiency may approximate, for example, forty-three percent, and the combustion mixture may be three or four percent natural gas by volume.

While the combustion mechanism of most reciprocating gas engines is that of a diesel, the fuel is provided by fumigation as opposed to direct injection into the individual cylinders. The mixing of gas fuel by fumigation includes injecting gas into an air intake that precedes the cylinders. The injection is, consequently, not necessarily done at high pressure and may be done utilizing a precisely controlled valve to admit low pressurized gas into a fuel intake. The air-fuel mixture may then be run through, for example, a turbocharger before entering the diesel combustion chamber.

Broadly speaking, reciprocating gas engines are purpose-built for running at a fixed rotational speed to generate electricity under a constant load for on-site generation of electrical power. Although these engines are capable of responding to variable loads that may alter the engine speed, the operational response is always to reestablish the fixed rotational speed. The control systems for these engines operate under strict governmental regulation and tend to govern engine speed by the amount of fuel provided to the fumigation intake system with feedback as to engine speed for the purpose of achieving a constant engine speed. If the engines fail to run at constant speed, the control mechanism will attempt to make several adjustments, but eventually the control systems shut down the engines if the desired engine speed is not obtained after a short period of time or if the engine speed falls below a predetermined threshold. This happens in part because, in systems designed for producing electricity for submission to the grid, use of an improper engine speed may create electric current that is out of phase with that of the grid, which can be a serious matter in the intended environment of use for these engines.

Taken altogether from the perspective of ordinary skill, these attributes disqualify reciprocating gas engines from use in situations where the engines are subject to various loads as in the case of oilfield hydraulic fracturing operations. As compared to diesel engines where a liquid fuel is injected directly into the combustion chamber, the fumigation-based fuel intake systems are much less responsive to control commands. Moreover, since the control systems are automated in a manner intended to achieve constant engine speed at constant load, the engines adjust poorly to transition states where the load is variable.

Such engines are also known to be sensitive to the make-up of the natural gas fuel as classified by methane number. While methane numbers are determined utilizing standardized methodologies, such determinations may be in practice a complicated matter as reported in United States Patent Publication No. 2017/0370831 to Kojima et al., which is hereby incorporated by reference to the same extent as though fully replicated herein.

Methane numbers assess the quality of a fuel as an indicator as to whether or not the fuel will cause undesirable knocking when consumed in an engine. The knocking phenomenon is otherwise known as premature detonation or auto-ignition. In the United States, suitable natural gas fuels are supposed to have a methane number of at least 75, but most fuels in use have a methane number of about 80 to 90. These fuels may be processed by well-known cryogenic or compression technologies to remove unwanted fractions with higher carbon chains that decrease the methane number.

Remote wellsite locations often have a supply of "field gas" as it has become known in the art. Generally speaking, this is raw gas that has not necessarily been fully processed for the removal of higher carbon fractions. Field gas is commonly made available from a production well, storage well, gathering system, pipeline, or transmission line for use as fuel to power field equipment. Such gas may have been, for example, produced from a natural gas reservoir or in association with the production of crude oil. This gas may be subjected to reduced pressure causing the gas to drop out heavier fractions as liquids, such as condensate, from the pressurized gas phase The field gas may be, for example, submitted to a gas processing plant for further extraction of liquids. Field gas may have any methane number, but in many liquids rich basins it is generally regarded as having a methane number of 40-60. This number is, generally speaking, below the design limits for reciprocating gas engines.

These reciprocating gas engine patents propose various engine control systems intended to mitigate the phenomenon of knocking when fuels of different quality may be provided to the intake of these engines. The controls adjust the timing of detonation as determined, at least in part, by the methane number of the fuel and the engine speed assessed as revolutions per minute ("rpm"). Because these control systems are reviewed by various governmental agencies and an approval process is in place for various features, it is difficult or impossible as a practical matter to programmatically modify the engine control systems for purposes other than their intended use, which is most often to generate electricity using a steady-state or constant engine speed.

It will be appreciated that the fuel intake system controls are preset at the factory and subject to regulatory compliance requirements of various government agencies. Thus, it is impractical to programmatically modify this system to resolve the problems outlined above. While not expressly stating the use of reciprocating gas engines and using instead the phrase "steady state gas engines," U.S. Pat. No. 11,391,269 to Tanner proposes the use of such an engine in a hybrid system that also utilizes an electric motor to assist the gas engine by selectively delivering additional power at times when the gas engine is unable to deliver sufficient power for use in hydraulic fracturing operations. The electric motor may double as a generator to brake the gas engine in circumstances where the gas engine is running too fast.

SUMMARY

The instrumentalities disclosed herein overcome the problems outlined above and advance the art by improving systems for driving pumps in support of hydraulic fracturing operations. More particularly, the disclosed instrumentalities materially advance the use of reciprocating gas engines when utilized in combination with dual electric machines that have been adapted for this use. One advantage of dual electric machines in this use is to improve the transfer of power when, for example, starting up a pump or shifting gears in a geared transmission. In another aspect, the power transition functionality may be further improved by adding a magnetic drive to improve a range of operating speeds obtainable from a transmission that is driven by a steady state gas engine, such as a reciprocating gas engine.

According to one embodiment, an oilfield hydraulic pumping system comprises a reciprocating gas engine having a first end and a second end. The reciprocating gas engine has an operating system that seeks to establish a constant operating speed when the reciprocating gas engine is operating under different loads. The pumping system also includes a hydraulic pump having a plurality of reciprocating pistons. A driveline extends between the reciprocating gas engine and the hydraulic pump. This driveline includes a transmission with a gear reduction system having a plurality of shiftable gears. The driveline is constructed and arranged to receive torque emanating from the second end of the reciprocating gas engine, pass the torque through the gear reduction system to produce a modified torque, and deliver the modified torque to the hydraulic pump. A dual electric machine is operably mounted at a position selected from a group consisting of: (1) at the first end of the reciprocating gas engine, and (2) within the driveline. The dual electric machine is configured to alter the torque emanating from the second end of the reciprocating gas engine. Control circuitry is provided with programmatic instructions for operating the dual electric machine by determining an amount of additional torque to support an upshifting of gears in the transmission, and altering the torque emanating from the reciprocating gas engine to provide the amount of additional torque in an operational mode selected from the group consisting of:

(A) prior to the upshifting of gears, preloading the reciprocating gas engine by braking with negative torque that operates against the torque emanating from the reciprocating gas engine so as to cause the reciprocating gas engine to exert additional torque as the reciprocating gas engine seeks to maintain the constant operating speed, (B) providing the amount of additional torque as positive torque to assist the torque emanating from the reciprocating gas engine, and (C) a combination of operational modes (1) and (2).

In one aspect, the dual electric machine may be mounted at the first end of the reciprocating gas engine, and this may be done in combination with programmatic control of the operational mode which may cause (A) prior to the upshifting of gears, preloading the reciprocating gas engine by braking with the negative torque. The program logic may further cause this operational mode to cease immediately upon the upshifting of gears as the preloading by the electric machine is replaced by the increased load from upshifting of gears in the transmission.

Alternatively, the dual electric machine is mounted at the first end of the reciprocating gas engine and the programmatic control of the operational mode may be that of (2) providing the amount of additional torque as positive torque to assist the torque emanating from the reciprocating gas engine. The program logic may cause this operational mode to commence immediately upon the upshifting of gears in the transmission.

In one aspect, the dual electric machine may be mounted in the drivetrain to the rear of the reciprocating gas engine and the control circuitry may cause the operational mode to be that of (1) prior to the upshifting of gears, preloading the reciprocating gas engine with the negative torque. The control circuitry may be programmatically configured to cease this operational mode immediately upon the up shifting of gears.

Alternatively, the dual electric machine may be mounted in the drivetrain to the rear of the reciprocating gas engine, and the programmatically controlled operational mode may be that of (2) providing the amount of additional torque as positive torque to assist the torque emanating from the reciprocating gas engine. This operational mode may commence immediately upon the upshifting of gears.

According to one embodiment, using natural gas as fuel for the reciprocating gas engine offers many advantages that are enhanced by the processing of field gas from an oilfield location to power the pumping system. The gas processing system may include a refrigeration unit and/or a compressor unit to assist with conditioning the gas for use as fuel. The various elements of the gas processing system may be utilized to improve the methane number of field gas into a range that is suitable for use as fuel in the reciprocating gas engine.

According to one embodiment, the pumping system is part of a larger array of equipment that may include a plurality of such pumping units together with at least one blender, all of which are purpose-built for dedicated use in hydraulic fracturing operations. In such cases, the pumping systems are configured to receive frac fluids from the blending unit(s).

According to one embodiment, the drivetrain optionally includes a magnetic drive, which is sometimes also called a magnetic clutch. By way of example, the magnetic clutch may deliver at least 1500 or even 2000 horsepower. The magnetic clutch is controlled to maintain engine speed of the reciprocating gas engine within a predetermined window as motive force from the reciprocating gas engine is applied to or withdrawn from the power end of the pump. It will be appreciated that, because reciprocating gas engines are designed to operate at a constant engine speed, each gear of the transmission will ultimately drive the frac pump at a single speed once the reciprocating gas engine achieves a steady state according to its design. A magnetic clutch advantageously utilizes field effects such that slippage may occur to present options for driving the hydraulic pump at a subrange of speeds available within a particular gear.

According to one embodiment, the pump system is operated by operating the hydraulic pump in at least one of the first mode and the second mode to move frac fluids in support of a hydraulic fracturing operation.

BRIEF DESCRIPTION OF THE DRAWINGS

FIG. 11 shows various operating parameters for a commercially available frac pump according to the prior art;

DETAILED DESCRIPTION

There will now be shown and described, by way of non-limiting examples, various instrumentalities for overcoming the problems discussed above.

Definitions

The following terms shall have the meanings set forth below unless the context of this Specification requires a different interpretation:

"Reciprocating gas engine" means an engine with one or more reciprocating pistons that is purpose-built to run on a gas fuel such as natural gas or fractionated natural gas and which is built to deliver at least 2000 horsepower when running at a steady state or speed over a sustained period of time;

"Methane number" is a value that is calculated as a quantitative measure relating the carbon and hydrogen content of a fuel and which may be used as a measure of fuel quality connoting a knock or anti-knock capability of the fuel. The calculation of a methane number according to one embodiment is exemplified by the disclosure of United States Patent Publication 2017/0370831 to Kojima et al., which is hereby incorporated by reference to the same extent as though fully replicated herein;

"Magnetic variable speed drive" means a system that includes a controller and associated structure for adjusting the strength of a magnetic field that couples a drive member, such as a drum or plate, with a driven member, such as a rotor, across a separation distance between the drive member and the driven member over which there is no mechanical connection such as a system of gears;

"Steady state" describes the operating condition of an engine or other motor that maintains a constant value which is permitted to vary slightly within normal operating tolerances of the engine or motor according to established expectations in the art. For example, a steady state may reference a constant engine speed determined as rpm or a constant power output.

"Gas fuel" means hydrocarbon material that may be combined with hydrogen or another source of energy and which exists when placed in a gaseous state at conditions of standard temperature and pressure, generally 273° K and 1 bar.

A "dual electronic machine" is a device that may be wired for use as an electric motor in a first mode to convert applied electric current into mechanical power and, further, may be electronically switched or reconfigured for operation in a second mode providing electric current when rotated. By way of example, a dual electric machine may be purchased on commercial order as the Model EM-PM1540-T3000 which may be purchased on commercial order as a hybrid motor from Danfoss of Nordborg, Denmark.

Description of the Preferred Embodiments

Figure 1:
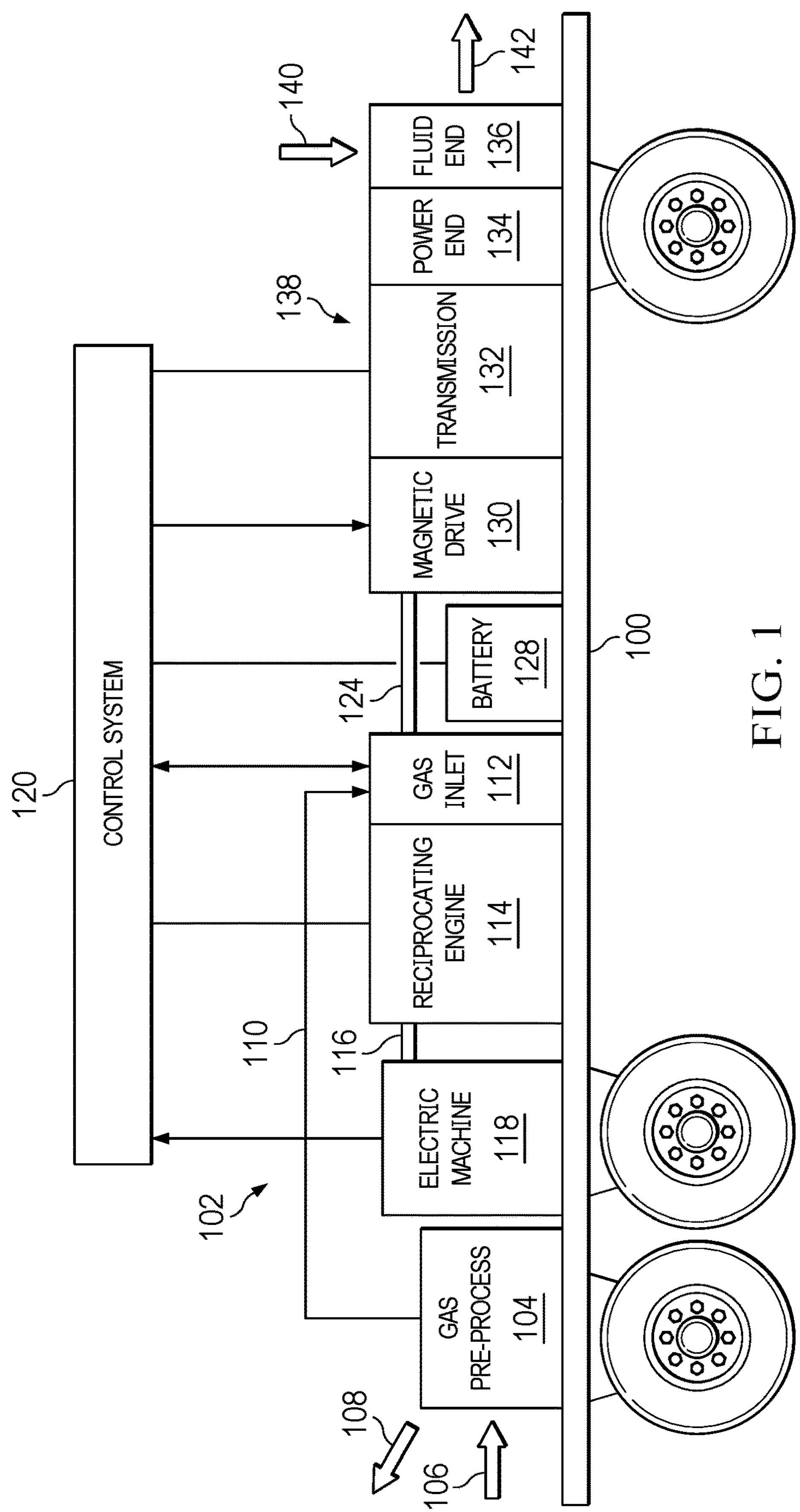
FIG. 1 shows a mobile system including a trailer or truck upon which is mounted a first embodiment of a pump drive system incorporating a gas preprocessing system enabling the use of field gas as fuel in a reciprocating gas engine, together with a magnetic clutch or variable speed magnetic drive enabling the reciprocating gas engine for use according to the presently disclosed instrumentalities.

FIG. 1 shows a truck or trailer 100 upon which is mounted a pump drive system 102 according to a first embodiment of the presently disclosed instrumentalities. The pump drive system 102 includes an optional gas preprocessing unit 104, which may be for example a compressor or a refrigeration unit capable of increasing a methane number characterizing an incoming flow 106 of gas fuel. The separated heavier fractions, such as ethane, propane and butane are separated as effluent 108 while the methane-enriched fraction is provided to fuel line 110 for delivery to a fuel intake component 112 of a reciprocating gas engine 114.

The reciprocating gas engine 114 is optionally but preferably a reciprocating gas engine as described, by way of example, in any one of U.S. Pat. No. 6,230,683 to zur Loye et al., U.S. Pat. No. 7,798,124 to Barrett et al., or U.S. Pat. No. 9,850,805 to Sotiropoulou et al. Commercially available reciprocating gas engines suitable for use as described herein include, for example, the MTU[1] series engines produced by Rolls Royce. These engines are built to run using natural gas and/or biogas-based fuels with specific application in generating electrical power, such as the use in generators producing electricity in the range from 250 to 550 kilowatts. These engines may be described as high efficiency lean burn diesel engines having a suitable compression ratio for the diesel combustion of gas fuels. Accordingly, this class of engine is sensitive to the methane number of the fuel, and overly low methane numbers may cause such problems as diesel knocking and lowered fuel efficiencies together with increased emissions. The gas preprocessing unit 104 advantageously improves the methane number of the incoming gas flow 106 in a manner permitting the use of field gas fuel as may be available at a remote wellsite location where a well stimulation operation is being conducted.

[1] MTU is a trademark or tradename of Rolls Royce Corporation headquartered in London, England.

Presenting the Rolls Royce engines as a case study, the reciprocating gas engines come from the factory including a fuel intake 112 that is designed to control the engine speed in the range of about 1500 rpm. Thus, the speed of the reciprocating gas engine is controlled for constant speed at variable loads. This class of engine has not been previously adopted for oilfield use because of the constant velocity design and the fuel problems noted above. Specific problems include a narrow band of permitted engine RPM ranging from about 1350 at a lower limit and 1600 RPM at an upper limit, such that the engine operation may become unstable and shut down if the engine speed wanders outside of this band. While such engines have sufficient native torque for oilfield use in a wider range of RPM, the RPM boundaries exist not only to prevent electric generators from introducing out of phase electrical current to the electric grid in their intended environment of use, but also to facilitate cleaner emissions. Trial attempts to adapt a reciprocating gas engine for oilfield pumping use revealed that this class of engine is not suitably responsive to meet requirements for variable power requirements due to changing loads on the engines. This problem has now been overcome by the combination described below.

The reciprocating gas engine 114 drives a power take-off shaft 116 actuating a dual electric machine 118. The dual electric machine 118 is designed to place a load on the reciprocating gas engine 114 approximating a design load for the reciprocating gas engine 114. The load may be, for example, that of a 550 KW generator receiving 700 horsepower when running at a constant velocity of at 1500 rpm. Electricity from the dual electric machine 118 may be used to charge a battery 128, and to power the electrical components of the pump drive system 102. Excess electricity may be used to power other components in a fleet of equipment (not shown), such as a blending unit, that are used to perform a hydraulic fracturing operation.

In practice, the battery 128 may be a lithium titanate (LTO) battery, such as a battery made of $Li_2TiO_3$ or $Li_4Ti_5O_{12}$. In this type of battery, LTO material replaces graphite as is usually found in the anode of other lithium ion batteries. The LTO material forms a spinel 3D crystal structure having a high surface area that may, by way of example, be in the range of 100 $m^2/g$ as compared to 3 $m^2/g$ for other types of lithium ion batteries. Because of this structure, LTO batteries may demonstrate a discharge capacity that is ten times greater with excellent safety because less heating occurs than with other types of lithium ion batteries. LTO batteries also have excellent low temperature performance and may cycle 20,000 times in a lifetime of use. These properties make the LTO type of battery uniquely suited for high demand applications in the intended environment of use, especially where the dual electric machine 118 is switched to perform in drive mode, as described below.

The dual electric machine 118 may be wired to function as an electric motor that provides a power or torque assist to the reciprocating gas engine 114. The dual electric machine 118 may also be wired to perform, for example, as a single phase or a three-phase generator. These generators can be programmatically switched by control circuitry to function as motors by use of a wiring arrangement that provides power to spin the armature of the generator for operation of the generator as a motor providing a power assist to the shaft 116 for purposes of stabilizing the speed of the reciprocating gas engine 114. A CPU-based control system 120 is wired to sense any material slowdown in the speed of the reciprocating gas engine 114 due to increased load and to provide load-balancing functionality by switching the dual electric machine 118 between states where the dual electric machine 118 is running as a generator or, alternatively, as a motor.

A magnetic clutch or magnetic drive assembly 130 is optionally provided to receive power output from driveshaft 124. Suitable variable speed magnetic drive components may be purchase on commercial order, for example, from MagnaDrive Corporation of Woodinville, Washington or Drive Source International of Sturtevant, Wisconsin. Power output from the driveshaft 124 is transferred to a transmission 132 driving a power end 134 that, in turn, drives a fluid end 136 of an oilfield frac pump 138. The transmission 132 is essentially a gear reduction system having a range of shiftable gears to provide suitable torque from the reciprocating gas engine 114 to the power end 134 for delivery of hydraulic horsepower from the fluid end 136 according to the design parameters of a hydraulic fracturing operation. It will be appreciated that in embodiments where the magnetic clutch 130 is omitted, the driveshaft 124 is connected directly to the transmission 132. Conversely, in embodiments where the magnetic clutch 130 is included, the transmission 132 is optionally omitted and the magnetic drive has an output shaft (not shown) connected directly to the power end 134. The transmission 132 may be purchased on commercial order, for example, as a seven or nine speed Cat® TH55™ series transmission. The frac pump 138 may be, for example, purchased on commercial order as a Cat® WS™ series pressure pump. The fluid end 136 operates in the standard manner to accept incoming frac fluid 140 from an upstream blending unit (not shown) and pressurize the frac fluid as effluent 142 to be used downstream in furtherance of a hydraulic fracturing operation.

Figure 2:
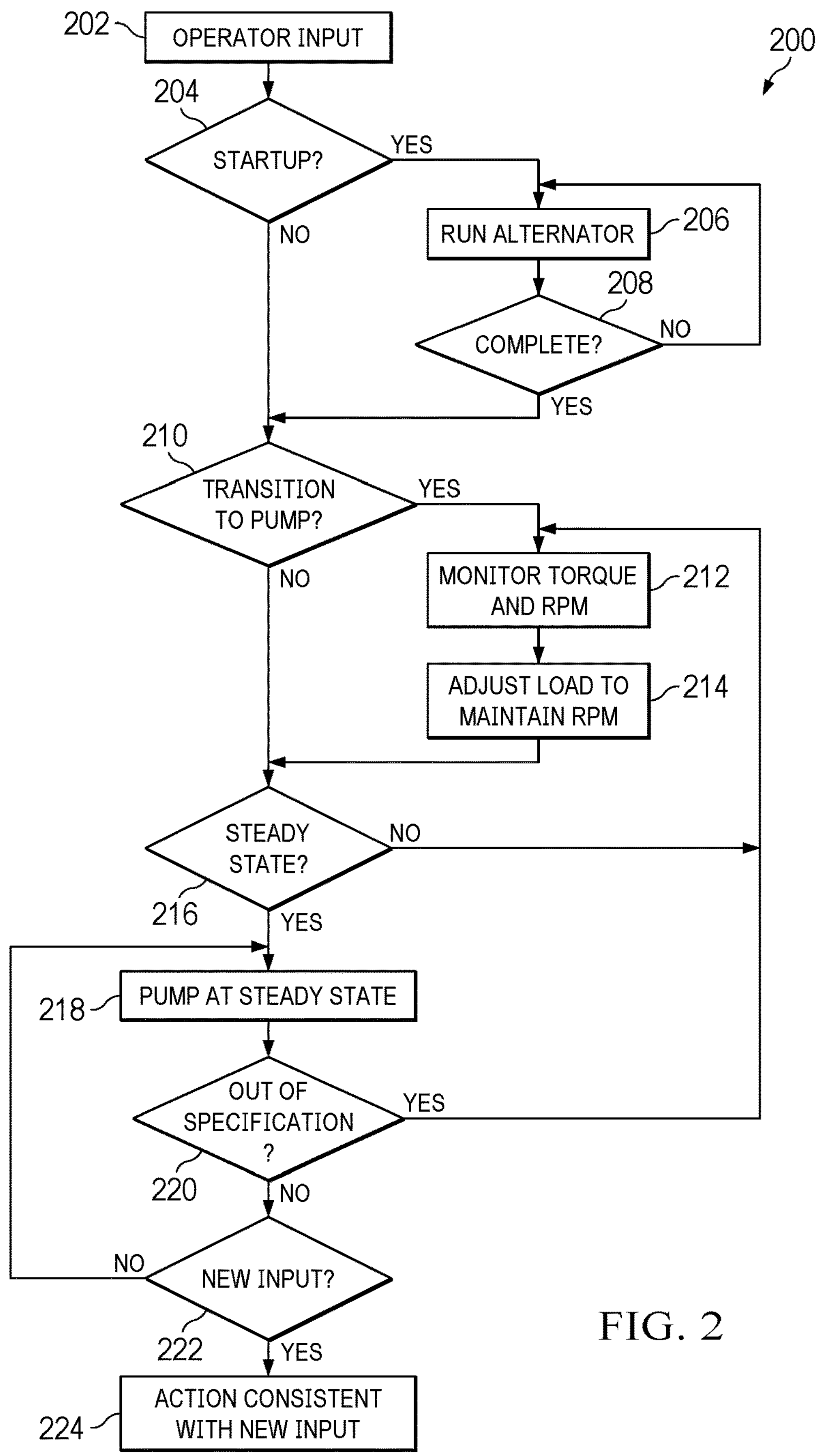
FIG. 2 is a flow chart of program logic for use in a controller that governs operation of the pump drive system.

FIG. 2 is a flowchart of program logic 200 according to one embodiment as may be used by the control system 120 for control of the magnetic clutch 130 (if provided) as well as the dual electric machine 118, fuel intake 112 and transmission 132. An operator, such as a sand controller who is performing a hydraulic fracturing operation, provides input 202 indicating an operational state of the pump drive system 102. Initially, the program logic 200 determines 204 whether this is a startup state where the reciprocating gas engine 114 is building up speed towards a design target of steady state rpm, such as a target of 1500 rpm. In the startup state, the dual electric machine 118 is running 206, as described above, to place a predetermined load on the reciprocating gas engine 114 with the produced electricity being stored in the battery 128 and provided also to power other systems in use during the performance of a hydraulic fracturing operation.

If the operator input 202 changes indicating that the startup is complete or if such readings as engine temperature, load and rpm indicate that startup is complete, the program logic 200 next determines 210 that the pump drive system 102 should transition into a pumping state. During this transition, the program logic 200 monitors engine rpm data for control of the fuel intake system 112.

To characterize this problem by way of hypothetical example, the design target may be a target of 3000 horsepower at 1500 rpm. As the control system 120 is transitioning from the startup to the pumping state the control system monitors 212 pump torque and rpm and, as necessary adjusts 214 the operation of the magnetic clutch 130 and/or the transmission 132 for the delivery of power to the power end 134 and, consequently, the fluid end 136. In consequence of this transition, if the fuel intake system 112 is left to its own responsiveness to load, it will always seek to establish a steady-state engine speed at a predetermined value according to its design. This steady state speed may by be, for example, a target rate of 1500 RPM. It is problematic that, when placed under an increased load such as occurs when upshifting gears of the transmission 132, the speed of the reciprocating gas engine 114 may drop from the target rate of 1500 rpm to another value below the lower limit of about 1480 rpm or perhaps even 1200 rpm before the reciprocating gas engine 114 is capable of responding to the demand for increased torque. In such cases the engine controls will cause the reciprocating gas engine 114 to shut down.

In this hypothetical example, because the fuel intake system 112 is designed to run the engine at the design speed of 1500 rpm, if left to itself under a load that is insufficient to cause the reciprocating gas engine to shut down, the fuel intake system 112 will then react to increase the engine speed towards the target rate. In this class of engine, due to a lag between issuance of the command to increase speed and the observed effect of having increased speed, the fuel intake system 112 typically overshoots the design target. Thus, the engine speed may increase past the target rate and, in consequence of automated engine controller instructions designed to increase speed towards the target rate, the reciprocating gas engine 114 may overshoot and achieve a speed of 1600 or 1700 rpm. Then, next diagnosing a need to reduce engine speed towards the target speed of 1500 rpm, the fuel intake system 112 may again overshoot the design target—this time on the way down. This manner of speed fluctuation is unacceptable in a hydraulic fracturing environment because the yo-yoing of rates causes operational problems. Greater precision is required. If left uncorrected, this problem will result in the exclusion of this class of engine for use in hydraulic fracturing.

For this reason, the adjustment 214 includes balancing the respective loads on the reciprocating gas engine 114 to maintain a relatively constant power output and engine speed at predetermined design target levels. This is done by providing a power assist to maintain engine speed under an increasing load that is to be imposed upon the reciprocating gas engine 114. The power assist is provided by switching the dual electric machine 118 to run as a motor while simultaneously increasing the load that is imposed by actuation of the magnetic clutch 130 and/or the transmission 132 to drive the frac pump 138.

Figure 6:
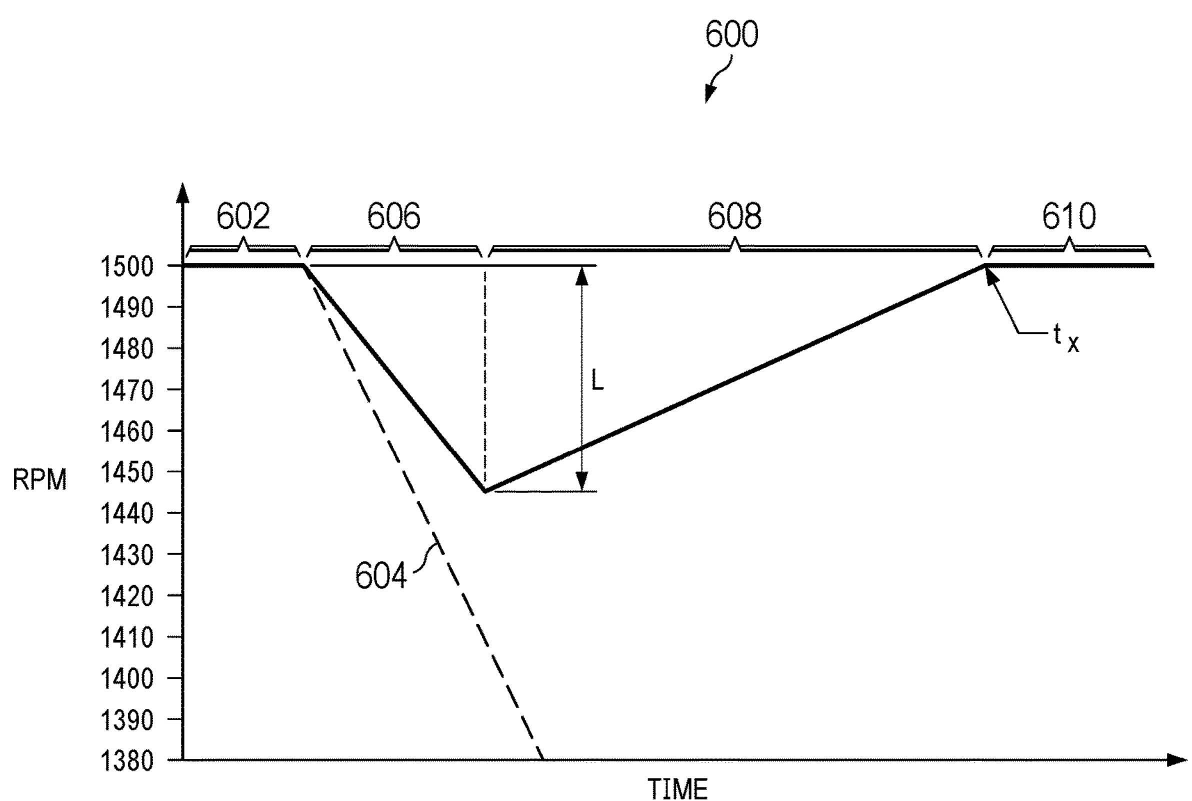
FIG. 6 shows an embodiment of program logic that may govern engine speed to mitigate the effects of transitional loading of the reciprocating gas engine.

This may be done, for example, by operation of the dual electric machine 118 under programmatic control as shown in FIG. 6. It will be appreciated that FIG. 6 shows an engine speed curve 600 for a reciprocating gas engine having a design target speed of 1500 rpm, but this target speed may be substituted for another target speed for a differently designed engine. The object of power assist is to maintain engine speed within the interval L because, within this interval, the engine control system does not shut down the engine and does not materially overcompensate for the reduction in engine speed by over-revving the engine. Section 602 of curve 600 represents a steady state velocity achieved during the startup phase and is assessed in step 208 of program logic 200 as indicating the startup is complete. Accordingly, the control system 120 commences step 210 by increasing horsepower or torque output to the frac pump 138, which is done by shifting the transmission 132 and/or engaging the optional magnetic clutch 130 while simultaneously switching the dual electric machine 118 to act as a motor providing a power assist to the reciprocating gas engine 114 through shaft 116 (See FIG. 1). The power assist thus provided thereby avoids a relatively steep decline 604 in engine velocity. During this transitional state, to an extent depending upon the ability of the power assist to resolve the transitional load, there may be a relatively shallow interval of decline 606 followed by a ramp-up interval 608 to a steady state engine velocity over interval 610. The step 216 of the program logic 200 interprets the curve 600 having achieved the target engine speed of 1500 rpm at time $t_x$ as having achieved the steady state target, so the program logic 200 at this time switches operation of the dual electric machine 118 back to that of a generator state, as opposed to that of a motor providing the power assist. It will be appreciated that the actual timing of $t_x$ may vary depending upon various factors such as the delay in responsiveness of the gas fumigation system of the reciprocating gas engine 114.

This process may be repeated each time the transmission 132 is shifted into a new gear. The provision of the magnetic clutch 130 provides additional flexibility to adjust slippage through the magnetic clutch 130 for purposes of achieving precisely set flowrates out of the frac pump 138 and to compensate for the loss of power assist when, following step 216 of the program logic 200, the program logic causes the dual electric machine 118 to cease functioning as a motor and to resume operation as a generator or alternator.

As discussed above in context of FIG. 1, the pump drive system may optionally contain a magnetic drive 130 in place of a geared transmission and without the dual electric machine. This embodiment is incapable of providing a power assist functionality, so step 214 of the program logic 200 merely entails controlling the magnetic drive 130 to limit the transmission of power such that the engine speed is maintained within the predetermined range L.

Once the logic 200 determines 216 that the pump drive system 102 is pumping at a steady state within suitable design tolerances, then the control system 120 causes the dual electric machine 118 to cease operating as a motor for power assist and to resume operation as a generator. The program logic 200 operates the pump drive system 102 to pump at the steady state 218 until such time as engine speed and/or power delivery are out of specification 220 as compared to the design targets or until new operator input is received 222 to take other action 224 consistent with the operator input. This may be done, for example, to initiate an engine shutdown sequence with cooling to occur over about a forty-five minute interval of time or to cease pumping at the steady state in favor of a new transitional state in step 210 based upon new design targets of engine speed and torsion.

Figure 3:
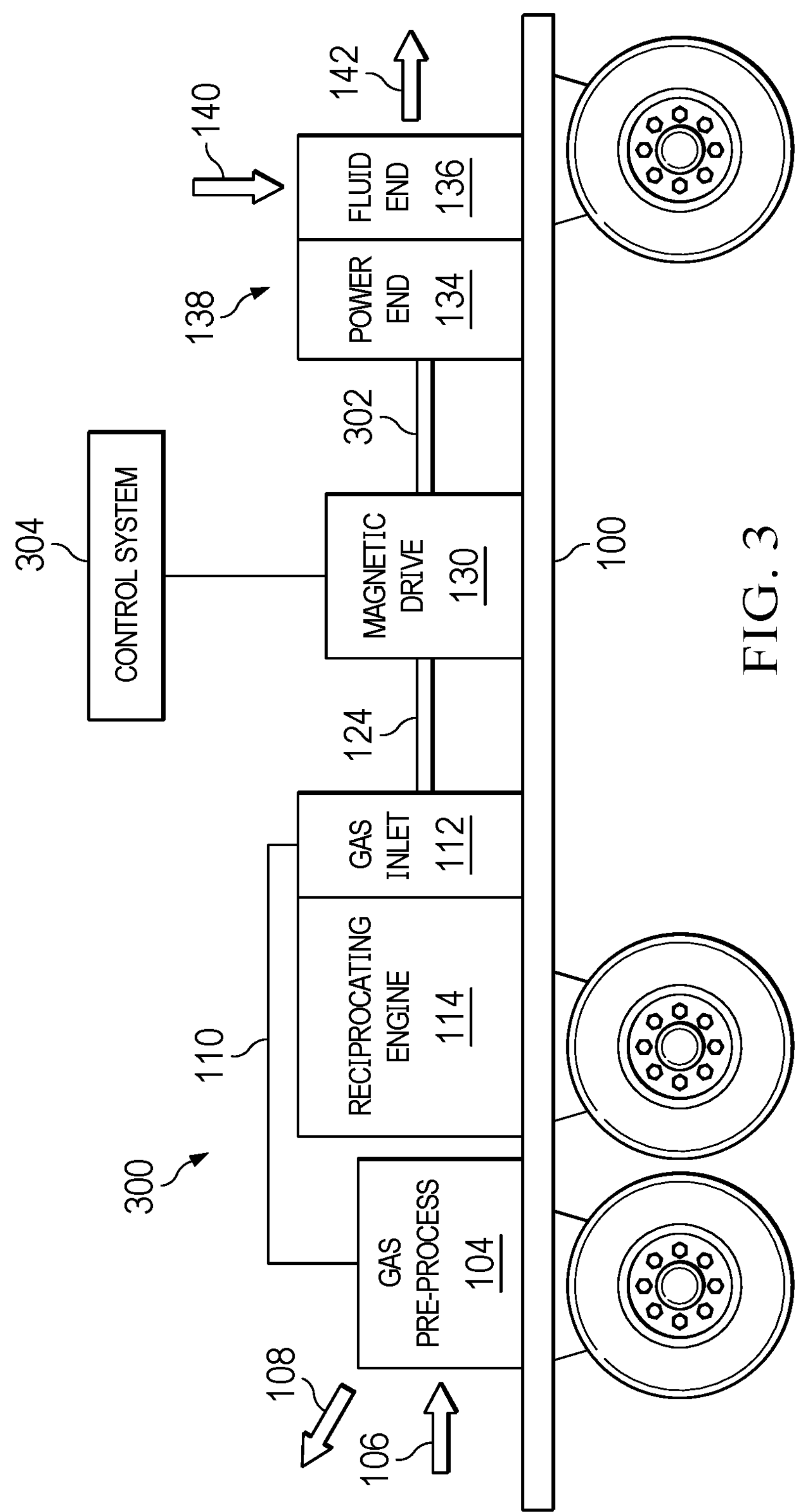
FIG. 3 shows a second embodiment of the pump drive system as implemented without a toothed-gear transmission such that variable speed control of the pump drive system derives only from the variable speed magnetic drive when the reciprocating gas engine is running at constant speed.

FIG. 3 shows an alternative embodiment in which like numbering of identical components is retained with respect to FIG. 1. Pump drive system 300 differs from the pump drive system 102 shown in FIG. 1 in that pump drive system 300 does not have a transmission 132 and does not require a dual electric machine 118. As shown in FIG. 3, the reciprocating gas engine 114 outputs horsepower on shaft 124 to a magnetic drive 130 which, in turn, provides horsepower through shaft 302 directly to the power end 134 of frac pump 138. The control system 304 operates in the same manner as described above in context of FIGS. 2 and 6, except there is no power assist and the decline in engine rpm over interval 606 together with the ramp-up interval 608 are limited to the predetermined range L by controlling slippage through the magnetic clutch 130. This may be done, for example, using an empirically derived correlation or look-up table that relates an indicator of field strength coupling the magnetic clutch of the magnetic drive 130 to the steady state engine rpms of interval 610.

As more fully described below, there are different types of magnetic drives including eddy current drives versus those with permanent magnets. Indicators that may be used for the eddy current drives include the voltage or current applied to a field coil energizing an electromagnet component of the magnetic clutch. For the class of permanent magnet drives, one such indicator is the separation distance between respective drive elements of the magnetic clutch.

Figure 4:
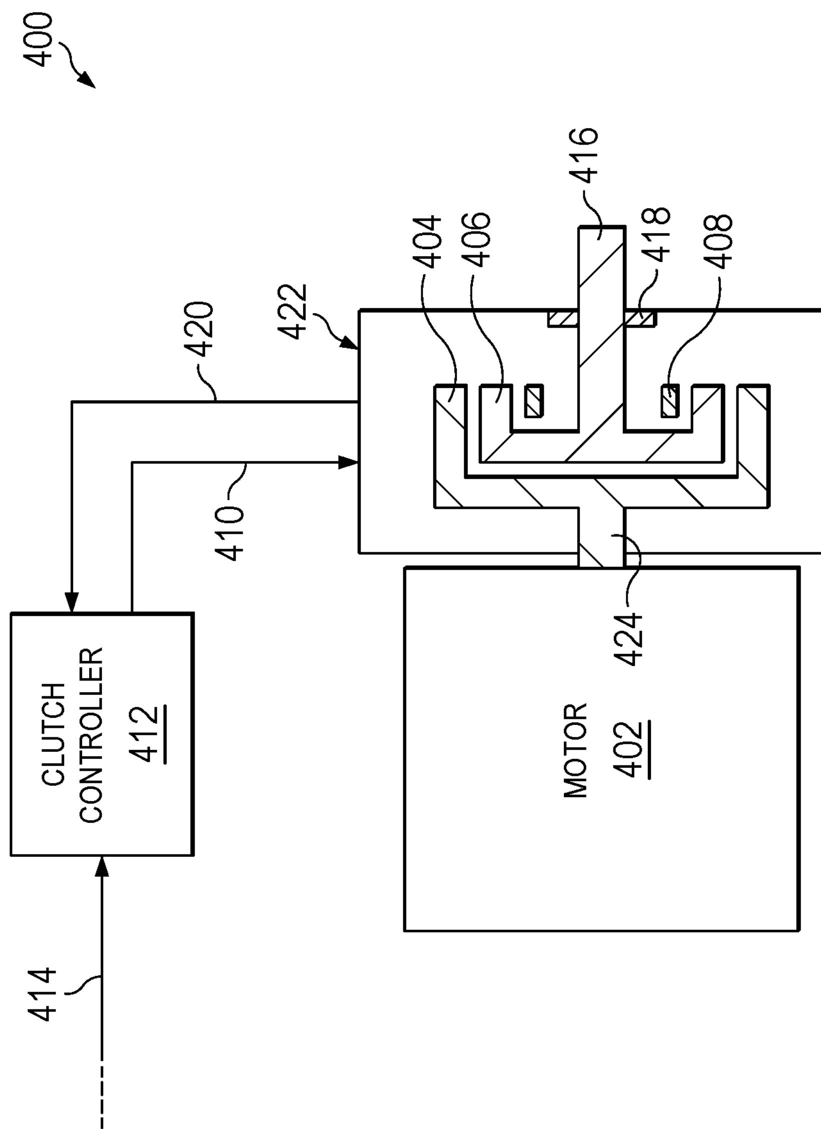
FIG. 4 shows a schematic of a variable speed magnetic drive that operates utilizing eddy currents associated with an electromagnet for magnetic coupling of a drum and rotor across a magnetic clutch assembly.

FIG. 4 shows the various components of a variable speed magnetic drive 400 in the class of eddy current magnetic drives that may be utilized as the variable speed magnetic drive 130 as shown in FIG. 3 according to one embodiment. A motor 402 may be the reciprocating gas engine 114 as described above, which may optionally be replaced by a constant speed electric motor. The motor 402 outputs power to driveshaft 124 as described above. A drum 404 is a magnetic drum or a drum into which are embedded high strength magnets, such as neodymium alloy magnets. A rotor 406 is magnetically coupled to the drum 404 and may itself contain embedded high strength magnets. A field coil 408 controls an electromagnet that may be selectively powered by electricity on line 410. A clutch controller 412 provides this electricity on demand, as may be communicated from electric power line 414. As the drum 404 rotates, magnetic forces impart torsion to the rotor 406, which is coupled to shaft 416. A magnetic tachometer 418 is attached to shaft 416 and may be read to provide a tachometer signal on line 420 to the clutch controller 412. In this type of drive, there is not a one-to-one ratio of rotation between the drum 404 and the rotor 406. The rotor 406 turns at a lower rate of speed than does the drum 404 due to slippage that is permitted to occur according to the strength of the magnetic field coupling the drum 404 with the rotor 406. The strength of this magnetic field, and hence also the amount of slippage and the power transferred to the power end 134 through the shaft 416, is controlled by varying the amount of electricity submitted to the field coil 408. Taken altogether, the combination of clutch controller 412, drum 404, rotor 406 and the field coil 408 form a magnetic clutch assembly 422. This becomes a variable speed magnetic drive 400 with motive force being provided by the motor 402 when the controller clutch 412 has the ability to vary the amount of electricity applied to the field coil 408.

Figure 5:
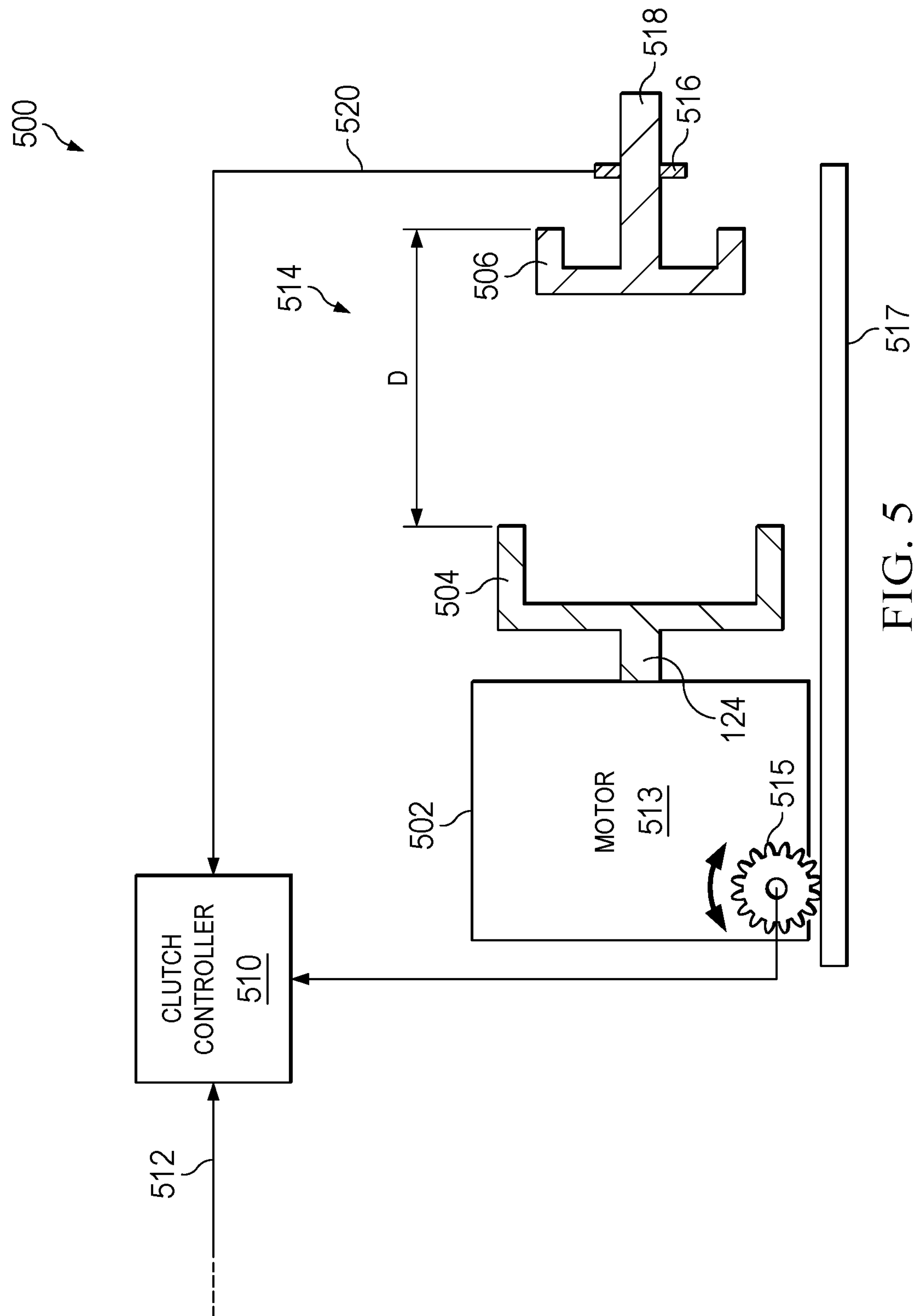
FIG. 5 shows a schematic of a variable speed magnetic drive that operates utilizing permanent magnets for magnetic coupling of a drum and rotor across a magnetic clutch assembly.

FIG. 5 shows the various components of a variable speed magnetic drive 500 in the class of permanent magnet drives that may be utilized as the variable speed magnetic drive 130 as shown in FIG. 3 according to one embodiment. A motor 502 may be the reciprocating gas engine 114 as described above, which may optionally be replaced by a constant speed electric motor. The motor 502 outputs power to driveshaft 124 as described above. A drum 504 is a magnetic drum or a drum into which are embedded high strength magnets, such as neodymium alloy magnets. A rotor 506 is magnetically coupled to the drum 504 and contains embedded high strength permanent magnets. As shown in FIG. 5, there is no counterpart to the field coil 408 as shown in FIG.

4, although such use of a field coil is not precluded. A clutch controller 510 provides this electricity on demand, as may be communicated from electric power line 512. The controller 510 selectively provides electricity to actuate a step motor 513 for precise rotation of a cog 515 along a toothed rail 517. The cog 515 and toothed rail 517 form a rack and pinion drive that is selectively actuated for adjustment of a separation distance D between the drum 504 and the rotor 506. The strength of the magnetic field coupling the drum 504 with the rotor 506 varies in proportion to the separation distance D, as does the slippage between the drum and the rotor 506 as rotational power is applied by the motor 502. Accordingly, the drum, 504 and the rotor 506 under the influence of the clutch controller 510 form a magnetic clutch assembly 514, and this becomes a variable speed magnetic drive assembly 500 actuated by the motor 502 because the controller 510 can adjust the separation distance D. A magnetic tachometer 516 is attached to shaft 518 and may be read to provide a tachometer signal on line 520 to the controller 510. In this type of drive, there is not a one-to-one ratio of rotation between the drum 504 and the rotor 506. The rotor 506 turns at a lower rate of speed than does the drum 504 due to slippage that is permitted to occur according to the strength of the magnetic field coupling the drum 504 with the rotor 506.

The use of a magnetic clutch and/or magnetic drive as described above has many advantages in the intended environment of use. By way of example in reference to FIG. 5, because the drum 504 and the rotor 506 are magnetically coupled and there are no metal gears to contact one another across the separation distance D, there is no wear and tear on a transmission such as the transmission 132 as shown in FIG. 1. The same holds true for the variable speed magnetic drive 400. Moreover, if either of the variable speed magnetic drives 400, 500 are accidentally activated to pump frac fluid against a closed valve, this circumstance is less likely to cause damage such as the rupturing of a high pressure line as compared to the prior art. This benefit derives from the slippage of the overloaded magnetic clutch assemblies 422, 514, as opposed to a gear reduction transmission such as transmission 132 if deployed without a magnetic clutch. More significantly, variable speed magnetic drives as described may be advantageously controlled for power balancing the load on a reciprocating gas engine in a manner that renders this class of engine suitable for use in hydraulic fracturing applications and, further, permits the use of field gas as a fuel for that purpose.

Figure 7:
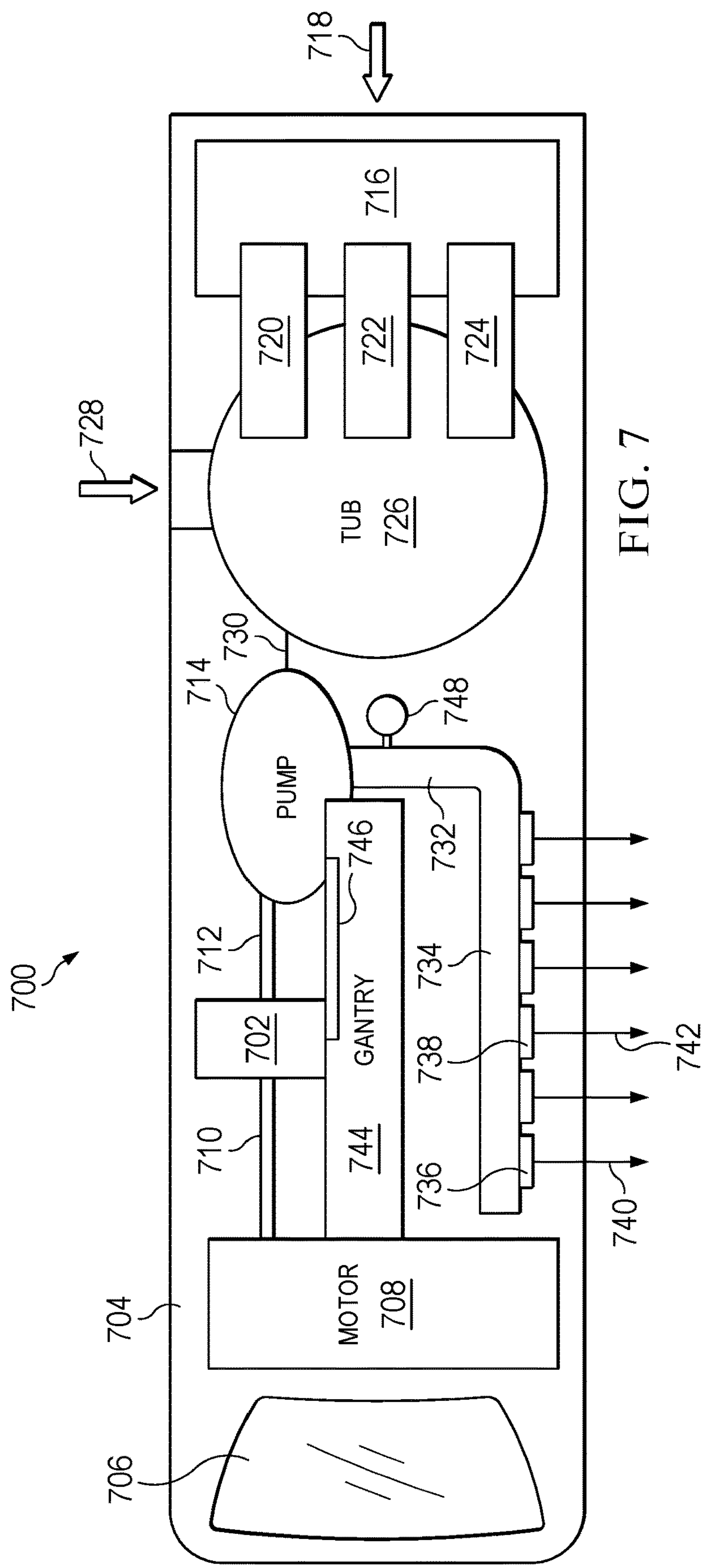
FIG. 7 shows a blending unit equipped with a centrifugal pump having a magnetic drive according to one embodiment of the disclosed instrumentalities.

FIG. 7 shows a blending unit 700 including a magnetic drive 702 according to the presently disclosed embodiments. The magnetic drive may be, for example, a magnetic drive 400 or 500 as disclosed above. The blending unit 700 is a self-propelled vehicle including a driver's cab 704 with a windshield 706. A motor 708 may be an internal combustion engine, such as a diesel engine, a variable frequency drive electric motor or, preferably, a reciprocating gas engine as described above. A first drive shaft 710 exiting the motor 708 provides input power to the magnetic drive 702 which, in turn, provides output power on a second drive shaft 712 to a centrifugal pump 714.

A blender hopper 716 is made to receive proppant 718, such as sand. Augers 720, 722, 724 move the proppant 718 upwardly to a blender tub 726, which may be a vortex mixer. As is known in the art, the blender tub 726 combines the proppant 718 with precisely measured quantities of fluids 728 to form a slurry exiting the blender tub 726 through pump intake line 730. The pump 714 pressurizes the slurry, discharging the same through discharge line leading to a manifold 734. The manifold 734 has a plurality of outlets 736, 738, each of which discharges a corresponding portion 740, 742 of the slurry. Volumetric pumping capacity of the centrifugal pump 714 is capable of meeting requirements for slurry volume as required for the performance of a hydraulic fracturing operation. The flow rates are preferably sufficient to maintain turbulent flow for maintenance of the slurry in the discharge line 732, the manifold 734 and in the slurry portions 740, 742. Each of the slurry portions 740, 742 may be utilized as the frac fluid 140 when placed in fluidic communication with the fluid end 136 of the frac pump 138 as shown in FIG. 1. The centrifugal pump 714 provides sufficient operational pressure for this use as is known in the art and may be suitably, for example 60 psi. If the operational pressure is too low, erosion induced by cavitation may quickly cause mechanical failure in the fluid end 136. An operator's gantry 744 includes a CPU-based control system 746 that is operably configured to receive signals representing sensed pressure from a pressure gage 748 in the discharge line 732 and to provide control signals for adjusting the amount of slippage in the magnetic drive 702 for the purpose of maintaining the pressure within the discharge line 732 within a predetermined range of values.

Use of the magnetic drive 702 as shown in FIG. 7 has many advantages. U.S. Pat. No. 5,133,624 to Cahill, which is incorporated by reference to the same extent as though fully replicated herein, describes centrifugal pumps as are commonly provided for discharge pumps on blending units of the prior art. As compared to other components of the blending units, the centrifugal pumps wear out quickly and are expensive to fix. This is because the nature of a centrifugal pump requires it to constantly spin in order to maintain the requisite operational pressure to avoid failure of the fluid end 136 while also meeting volumetric flow rate requirements for maintenance of the slurry as described above. Operating the centrifugal pumps at an overpressure condition causes premature wear as the slurry abrades wear plates within the centrifugal pumps to cause premature failure. There is a tendency to run the centrifugal pumps of the prior art at an unnecessarily high overpressure condition because a pressure that is too low results in the cavitation problem, but this comes at a cost. The centrifugal pumps tend to wear out quickly. This is commonly accepted as a sacrifice to protect the fluid end 136, which is quickly destroyed by cavitation and is more expensive to repair than is the centrifugal pump. The use of magnetic drive 702 avoids this by providing a finely tunable rate of slippage facilitating operation of the centrifugal pump 714 at a range of pressure that is narrower and lower than what is obtainable from the prior art.

Moreover, the use of magnetic drive 702 advantageously permits the utilization of a reciprocating gas engine as the motor 708 while avoiding the need for a gear reduction transmission between the motor 708 and the centrifugal pump 714 and providing a more tunable range of rotation speeds submitted to the centrifugal pump 714 than can be obtained from a gear reduction transmission.

Figure 8:
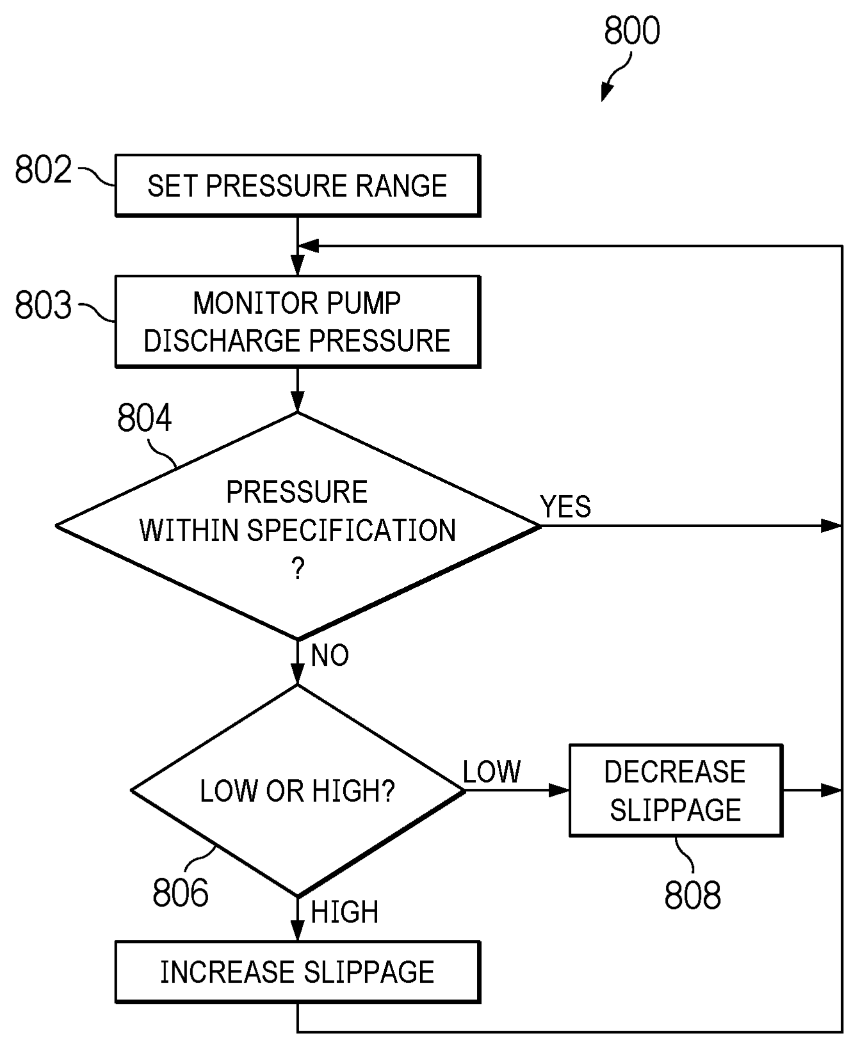
FIG. 8 is a flowchart of program logic for use in a control system of the blending unit, including a feedback mechanism for maintaining a predetermined pressure within a discharge of effluent from the centrifugal pump.

FIG. 8 shows program logic 800 that may be utilized by the CPU-based control system 746 as a feedback mechanism for control of pressure in the discharge line 732. An operator provides 802 a predetermined range of values as setpoints for maintenance of operational pressure in the discharge of effluent from the centrifugal pump 714. As pumping commences, the pressure gage 748 provides signals representing pressure in the discharge of slurry from the centrifugal pump 714. The control system 746 monitors 803 this pressure to ascertain 804 whether the pressure is within the predetermined range of values. If so, then the control system 746 continues to monitor 802 the discharge pressure. If, alternatively, the pressure is determined 804 to be out of specification, the control system 748 ascertains 806 whether the pressure is low or high. If the pressure is low at step 806, then the control system provides instructions to decrease 808 slippage through the magnetic drive 702 until such time as the pressure is within specification, and preferably at about the middle of the pressure range setpoints. If, alternatively, the pressure is too high at step 806 then the control system provides instructions to increase slippage through the magnetic drive 702, also until such time as the pressure is within specification.

Figure 9:
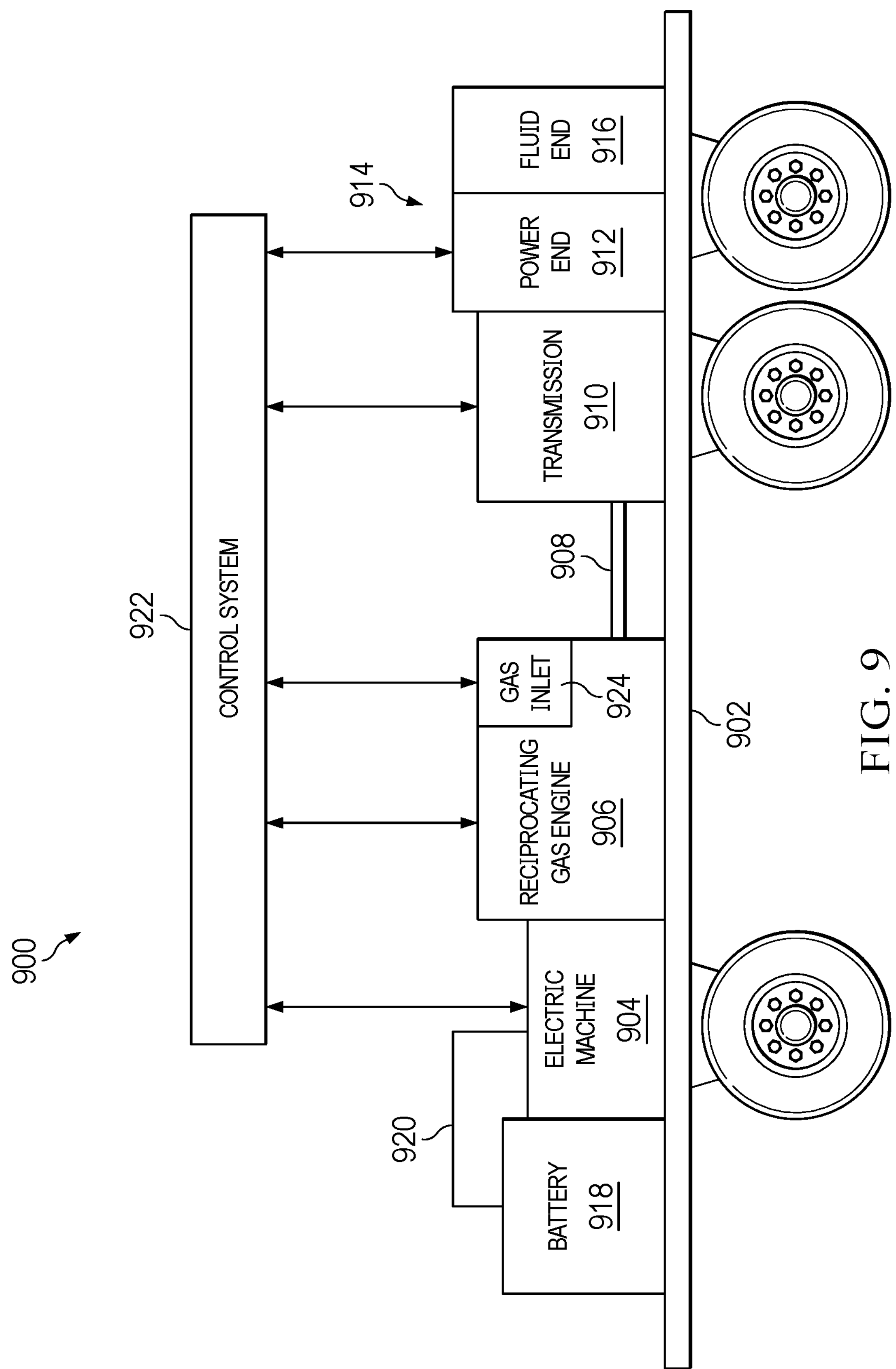
FIG. 9 shows a hydraulic pumping system for oilfield use according to one embodiment.

FIG. 9 shows a second embodiment including a pumping unit 900 mounted on a roadable trailer 902. A dual electric machine 904 is operably coupled to drive one end of a reciprocating gas engine 906 which at the opposite end provides output power to a driveshaft 908 that, in turn, drives transmission 910. The transmission 910 drives a power end 912 of a reciprocating frac pump 914 having a fluid end 916. Natural gas is pre-processed remotely from the trailer 902 to provide fuel of acceptable quality for submission to the gas inlet of the reciprocating gas engine 906. The dual electric machine 904 is electrically switchable between operational modes including:

1. A first mode in which the dual electric machine 904 functions as a generator to preload the reciprocating gas engine 906 with torque that works against the torque from the reciprocating gas engine 906 while charging a battery 918 by providing current on line 920;
2. A second mode in which the dual electric machine 904 consumes power from the battery 918 while providing a torque assist to an internal crankshaft (not shown) of the reciprocating gas engine 906; and
3. A third mode in which the dual electric machine 904 provides neither a preload nor a torque assist while the reciprocating gas engine alone drives the transmission 910 and the power end 912.

In the first mode described above, it will be appreciated that in most commercially available embodiments the gas inlet 924 of the reciprocating gas engine 906 is a fumigation intake, and that such engines are designed to run at a steady state or constant speed. Programmatic controls built into the reciprocating gas engines are stringently controlled by governmental regulation, and these engines are made to seek a constant operating speed, such as 1500 rpm, while meeting also, within design limits, a demand to meet whatever load is being placed on the reciprocating gas engine 906. The gas inlet 924 most often contains a turbocharger, and the speed adaptability of the reciprocating gas engine 906 is in large part limited by the speed of an internal turbocharger (not shown).

In the intended environment of use, as discussed above, there is a need to prevent the reciprocating gas engine 906 from stalling or shutting down when upshifting gears to take on an increased load. By way of example, when upshifting into first gear or from $5^{th}$ gear into $6^{th}$ gear, this places an increased load that lugs the reciprocating gas engine 906 down to a speed less than the engine design target speed which may be 1500 rpm. Internal sensors to the reciprocating gas engine 906 provide signals that document this reduction in engine speed. A control system 922 associated with the reciprocating gas engine 906 interprets these signals and issues commands to adjust operational parameters of the gas inlet 924 such that the reciprocating gas engine 906 increases speed to stabilize at the engine design target speed under the new loading condition.

Figure 10:
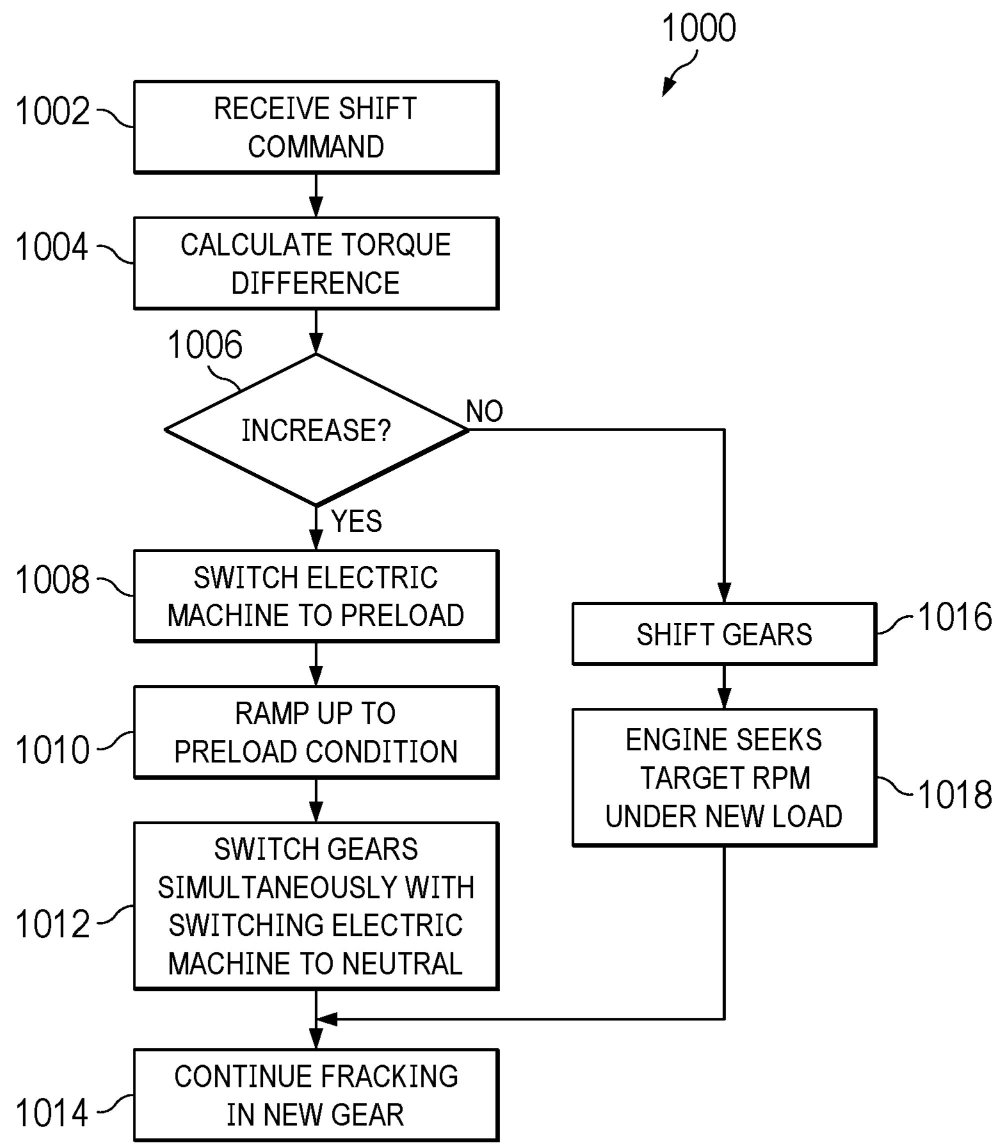
FIG. 10 presents a flowchart of program logic for use in a control system that governs operation of the hydraulic pumping system in a mode of preloading the reciprocating gas engine to facilitate shifting of gears according to one embodiment.
Figure 12:
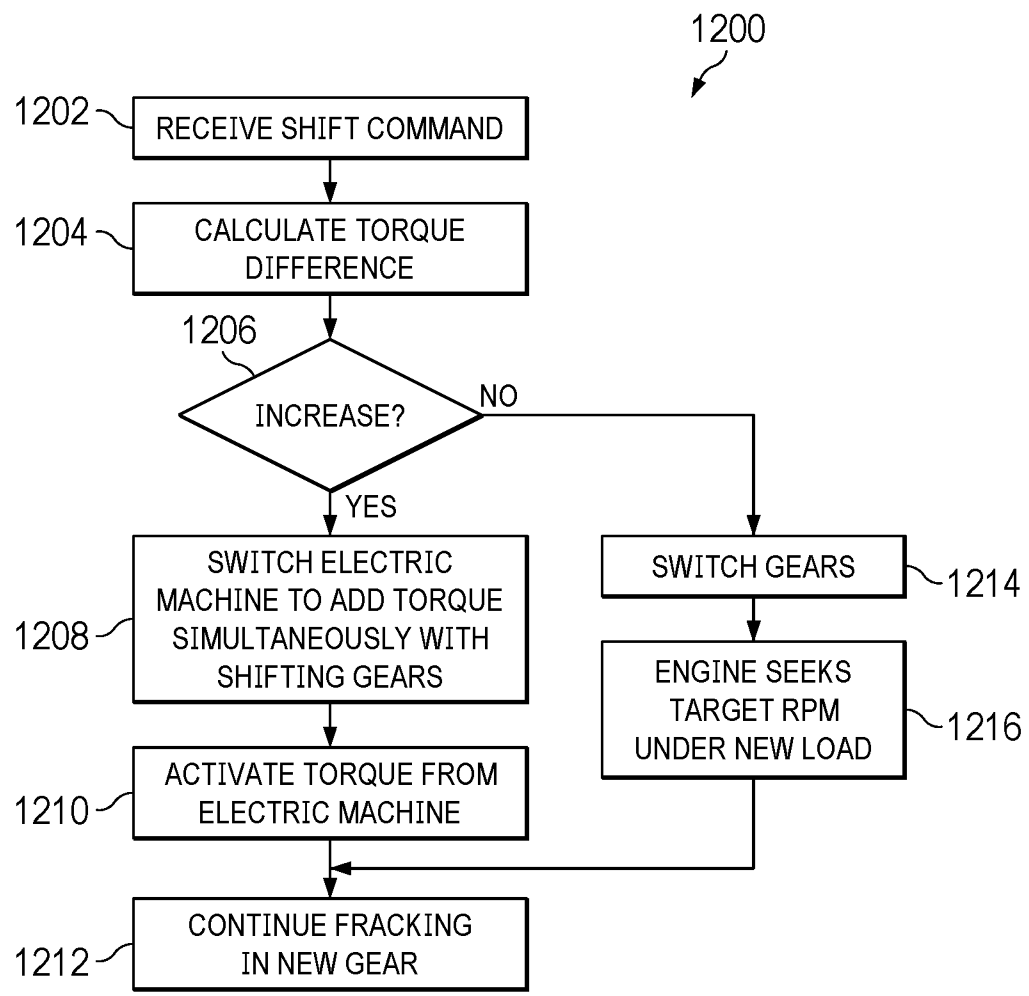
FIG. 12 presents a flowchart of program logic for use in a control system that governs operation of a hydraulic pumping system in a mode of providing torque assistance to the reciprocating gas engine to facilitate shifting of gears according to one embodiment.

There is problematically a delay in bringing the engine up to speed because the fumigation system, and especially any turbocharger component thereof, requires time to adjust. While the engine speed adjustment happens quickly over a few seconds, from an operational perspective the response time is much slower than happens in comparison to that of fuel injected diesel engines. Moreover, if the increased load causes the speed of the reciprocating gas engine 906 to fall below a lower limit design threshold of, for example, 1480 rpm, the engine is built to shut down rather than continue running at lower speeds which may damage the engine and/or produce emissions that are unacceptable from a regulatory standpoint. Accordingly, the control system 922 may be advantageously programmed to utilize a dual electric machine to overcome these problems as shown in FIGS. 10 and 12. In this regard, it will be appreciated that circuitry elements of the control system 922, such as a CPU and memory, may be physically located together in a single housing or, alternatively, located among various CPUs and memories in a distributed processing environment housed in separate structures.

FIG. 10 is a flowchart of program logic 1000 for operation of the control system 922 (see FIG. 9) to preload the reciprocating gas engine 906 in a manner that mitigates or avoids the problem of the reciprocating gas engine 906 stalling or shutting down. An operator determines that there is a need to shift gears in the transmission 910, which may be either an upshift or downshift. The control system 922 receives 1002 a signal representing this command and calculates 1004 a torque difference in the required output of the reciprocating gas engine that is to be expected in response to the shifting of gears. By way of example, this calculation may begin as a hydraulic horsepower calculation according to Equation (1) below:

$$\mathrm{HHP}=P*Q/1714, \quad (1)$$

where

HHP is hydraulic horsepower in horsepower, P is pressure in pounds per square inch, and Q is flow rate in gallons per minute.

Torque may then be calculated according to Equation (2):

$$\tau=\mathrm{HHP}*5252/R/G, \quad (2)$$

where $\tau$ is torque in foot-pounds at the output of reciprocating gas engine 906, R is engine speed in rpm, and G is a gear reduction ratio through the transmission 910. Note that $\tau=0$ when $R=0$ The differential torque calculation avails Equations (1) and (2) at different flowrates Q, subtracting the resulting torque values to ascertain the difference in torque. The first flow rate will be that for the pump output when the reciprocating gas engine is running at the engine design speed (e.g., 1500 rpm in the example above) and the transmission 910 provides a gear reduction ratio associated with the new gear after shifting is to occur. The second flowrate is that for the pump before the shifting of gears happens. At this time the dual electric machine 904 is operating in a neutral mode providing neither torque assist nor generating of electricity.

The program logic 1000 next determines 1006 whether the torque differential requires an increase in torque or a decrease in torque output from the reciprocating gas engine 906. If the torque must be increased, then the control system switches 1008 the dual electric machine 904 (see also FIG. 9) into electrical generation mode. In consequence of being switched, the dual electric machine 904 provides negative torque that works against the drive torques of the reciprocating gas engine 906 This causes the reciprocating gas engine 906 to increase its torque output because, according to the design of the reciprocating gas engine, the additional load will cause the reciprocating gas engine 906 to slow its speed with the reciprocating gas engine 906 responding by increasing its torque output to regain its target engine speed.

The dual electric machine 904 may be programmatically adjusted to control torque output by adjusting the level of electricity generation once the dual electric machine 904 is switched to electrical generation mode. This is done as a design feature of the dual electric machine 904 by varying a voltage signal applied to a Wheatstone bridge or similar circuitry as is well-known in the art. By this expedient, the dual electric machine 904 may be controlled to deliver more or less torque as determined by the torque differential calculation described in context of Equations (1) and (2). Control of the voltage signals may be done, for example, as a programmatic feature of the dual electric machine 904 or on the basis of a correlation, such as a least squares correlation relating the voltage signal to the torque braking effect of the dual electric machine 904 when switched into electrical generation mode. The voltage signal may be ramped 1010 over time to achieve the necessary torque differential without causing the speed of the dual electric machine 904 to fall below a design threshold (1200 rpm in the example above) causing the dual electric machine 904 to shut down.

By way of example, FIG. 11 shows frac pump performance specifications published by GD Energy Products of Milwaukee, Wisconsin for their THUNDER 5000™ hydraulic fracturing pump. The power end of this pump may be provided with one of two gear reduction ratios, either 7.525:1 or 11.232:1. When the pump is provided with 4 inch diameter pistons and the power end is receiving input from a drive shaft (from transmission 910) driven at 376 rpm, the gear reduction ratio of 7.525:1 produces 50 rpm (the value R of Equation (2)) yielding a design output of 150 GPM, which is value Q of Equation (1). The transmission 910 itself may be, for example, a CX48-P2300™ Oilfield Transmission made by Caterpillar of Irving, Texas having eight gears with gear reduction ratios ranging including 3.34:1 in first gear, 2.45:1 in second gear, 2.20:1 in third gear, 1.81:1 in fourth gear, 1.62:1 in fifth gear, 1.36:1 in sixth gear, 1.19:1 in seventh gear, and to 1.00:1 in eighth gear.

Working Example

Calculating the Ramp

To calculate the ramp according to step 1010 of FIG. 10, Equation (2) is used to calculate a quantity:

$$\Delta\tau=(\tau_2-\tau_1)\eta, \quad (3)$$

where $\Delta\tau$ is a difference or change in torque in foot pounds, $\tau_1$ is torque in foot pounds at a first time before shifting occurs, and $T_2$ is torque in foot pounds at a second time after shifting occurs, and $\eta$ is a threshold percentage of required incremental torque at that should or must be met before shifting occurs.

Thus, in a case where the transmission 910 is in neutral, the frac pump 914 is idle so that Q=0, and the pumping pressure is 8,000 psi, by application of Equation (1), $$HHP_1=8{,}000*0/1714=0 \quad (4)$$

$$\tau_1=0 \quad (5)$$

Where a pump operator wants to engage the frac pump 914 by shifting the transmission 910 into first gear, the frac pump 914 is configured with five inch diameter pistons (see FIG. 11) and a gear reduction ratio of 7.525:1, the pumping rate is 467 GPM (see FIG. 11), the torque threshold is 80% and the gear reduction ratio G of transmission 910 is 3.34:1

$$HHP_2=8{,}000*467/1714=2180\text{ HP} \quad (6)$$

$$\tau_2=2180*5252/753/3.34=4552\text{ ft lbs.} \quad (7)$$

$$\Delta\tau=(4552-0)*0.8=3641\text{ ft lbs.} \quad (8)$$

This is the amount of torque that the dual electric machine 904 produces in opposition to the drive torque from the reciprocating gas engine 906.

Equation (9) provides the ramp time:

$$R_R=\Delta\tau/R_T \quad (9)$$

where $R_R$ is the ramp time in seconds, and $R_T$ is a rate of torque change in ft lbs per second. $R_T$ is an empirically derived rate sufficient to prevent the reciprocating gas engine 906 from stalling or shutting off when shifting gears.

Generally speaking, the dual electric machine 904 may be suitably sized such that the ramp time $R_T$ ranges from three to seven seconds in preferred embodiments. This occurs under programmatic control as the control system 922 configures the dual electric machine 904 to generate electricity under a corresponding increase of torque that is placed on the reciprocating gas engine 906 accordingly as the reciprocating gas engine 906 drives the dual electric machine to meet this increasing load. Thus, where the ramp time is five seconds:

$$R_R=3641/5=728\text{ ft lbs/s} \quad (10)$$

Once the reciprocating gas engine 906 is generating sufficient reverse torque to suitably preload the reciprocating gas engine 906, upshifting 1012 of the transmission 910 occurs simultaneously with a programmatic switching off of the dual electric machine 904. The dual electric machine 904 is thereby configured to operate in a neutral state that neither provides a torque assist nor generation of electricity. The load on the reciprocating gas engine 906, which was formerly imposed by the dual electric machine 904, is thereby transferred to the transmission 910 and the frac pump 914. The frac pump continues fracking 1014 in the new gear as the rotational speed of reciprocating gas engine 906 continues to climb towards its design speed, which in this case is 1500 rpm.

If in step 1006 the program logic 1000 determines that a downshift is occurring, so no increase of torque is required, it is then possible to immediately shift gears 1016 such that the reciprocating gas engine 906 seeks the target rpm at the new load 1018.

FIG. 12 shows program logic 1200 for an alternative method of avoiding engine shutdown. The program logic 1200 does not rely upon using the dual electric machine 904 to preload the reciprocating gas engine 906 with negative torque in the manner of program logic 1000. The program logic 1200, instead, provides a positive torque assist. An operator determines that there is a need to shift gears in the transmission 910, which may be either an upshift or downshift. The control system 922 receives 1202 a signal representing this command and calculates 1204 a torque difference in the required output of the reciprocating gas engine 906 that is to be expected in response to the shifting of gears. By way of example, this calculation may begin as a hydraulic horsepower calculation according to Equation (1) above. Torque may then be calculated according to Equation (2). The delta torque value of Equation (3) in this instance does not represent the value of negative or preloading of torque, but the amount of positive torque addition that is needed from the dual electric machine 904 to meet the increased demand for additional torque from the reciprocating gas engine 906.

The program logic 1200 next determines 1206 whether the torque differential requires an increase in torque or a decrease in torque output from the reciprocating gas engine 906. If torque must be increased, then the control system switches 1208 the dual electric machine 904 (see also FIG. 9) into active drive mode simultaneously with the switching of gears in the transmission 910. Drive power emanating from the dual electric machine 904 may be programmatically controlled as is well-known in the art. By this expedient, the dual electric machine 904 may be controlled to deliver more or less torque as determined by the torque differential calculation described above. The power assist feature may be activated 1210 over a period of time, such as ten seconds or so, to provide the necessary torque without causing the speed of the dual electric machine 904 to fall below a design threshold (1480 rpm in the example above) causing the dual electric machine 904 to shut down. Once the speed of the reciprocating gas engine 906 is at the design target level, the frac pump 914 operates at a constant speed until such time as there is a further need to shift gears.

If in step 1206 the program logic 1200 determines that the torque output from the reciprocating gas engine 906 needs to decrease, as is the case for downshifting the transmission 910, then the gears are switched 1214 and the engine seeks 1216 to stabilize at the target speed according to its design parameters.

Figure 13:
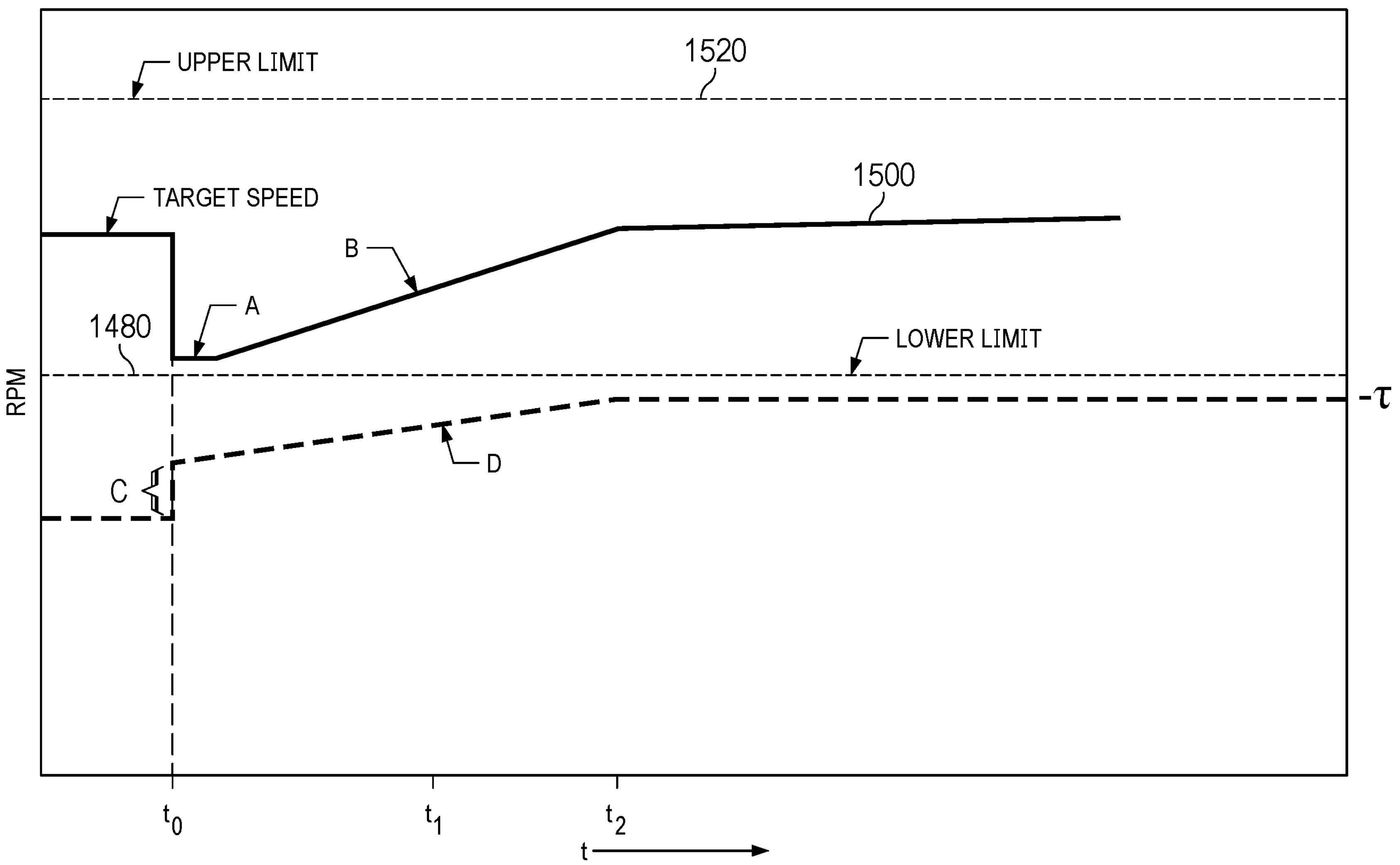
FIG. 13 demonstrates torque and engine speed relationships when operating the hydraulic pumping system in the mode of FIG. 10.

FIG. 13 shows the effect that program logic 1000 (see also FIG. 10) has upon operating parameters of engine speed and torque. The control system 922 switches the dual electric machine 904 into generator mode at time $t_0$ to preload the reciprocating gas engine 906, in step 1008. This places an immediate load on the reciprocating gas engine 906 that causes the engine speed to fall from the design target speed of 1500 rpm. The target speed is bounded by an upper limit of 1520 rpm and a lower limit of 1480 rpm such that the control system 922 will cause the reciprocating gas engine 906 to shut down if the engine speed reaches a value outside the bounded range. Accordingly, the engine speed falls to a value A that is slightly above the lower limit to prevent engine shutdown. Thereafter, the engine speed ramps up towards the target speed of 1500 rpm. These changes in engine speed result from torque that the dual electric machine 904 places upon the reciprocating gas engine 906 after the reciprocating gas engine 906 is placed in generator mode, and this torque may vary as a matter of programmatic control according to design features of the dual electric machine 904. An initial loading at C causes the reduction in engine speed from the target speed to A. Thereafter, the torque is ramped up at section D to produce the corresponding ramp in engine speed at B. At step 1012, the control system 922 upshifts the gears of transmission 910 at time $t_2$ simultaneously with switching the dual electric machine 904 into a neutral mode that no longer delivers preload and does not provide torque assist. Thus, the preload of torque that has been built up from time $t_0$ to $t_2$ is replaced by the increased torque demand from driving the frac pump at a higher speed attributable to having shifted the gears of the transmission 910.

Figure 14:
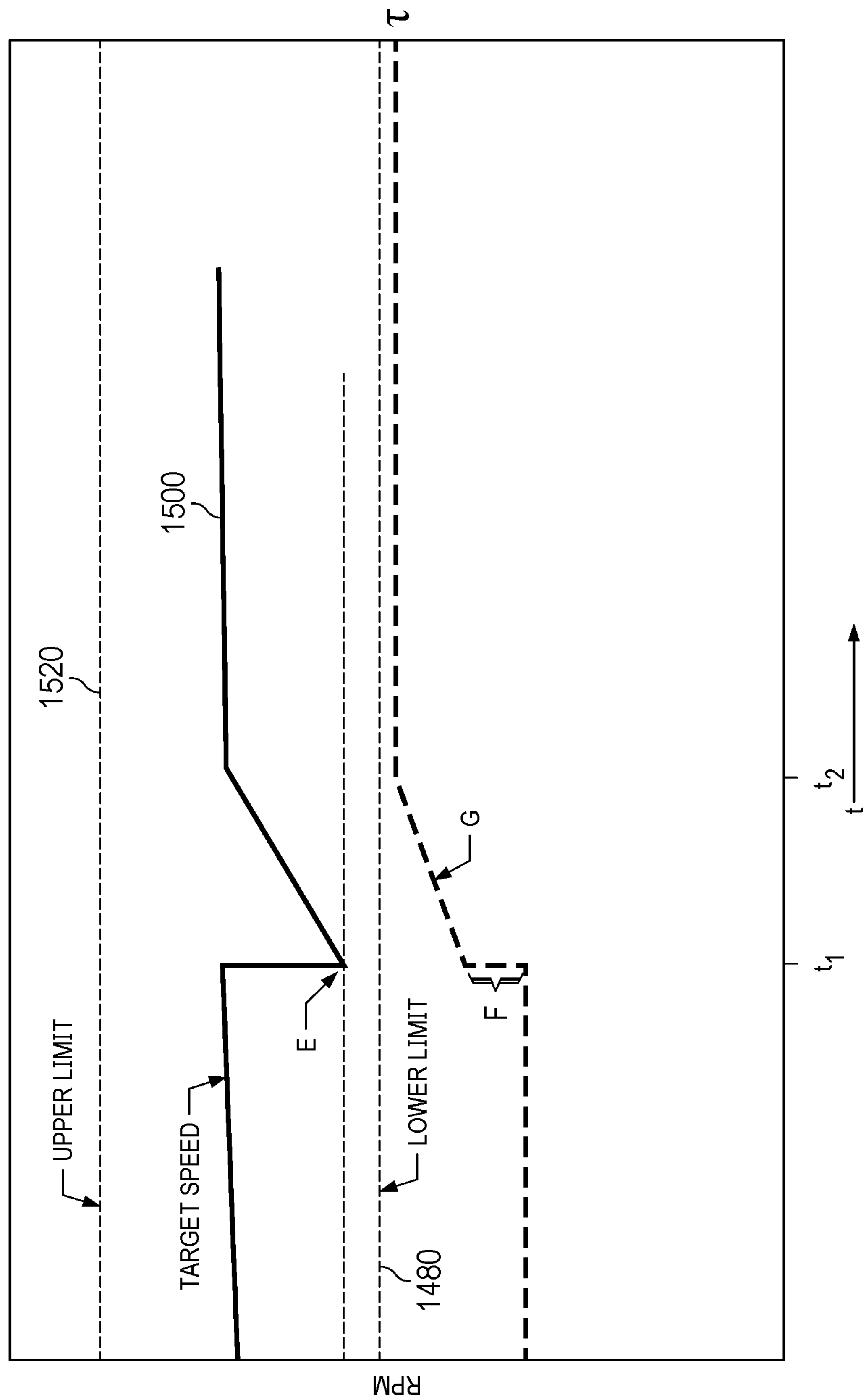
FIG. 14 demonstrates torque and engine speed relationships when operating the hydraulic pumping system in the mode of FIG. 12.

FIG. 14 shows the effect that program logic 1200 (see also FIG. 12) has upon operating parameters of engine speed and torque. The control system 922 switches the dual electric machine 904 into drive mode at time $t_1$ to supplement or assist torque emanating from the reciprocating gas engine 906, in step 1208, and this happens simultaneously with upshifting of gears in the transmission 910. The shifting of gears increases loading of the reciprocating gas engine 906 such that engine speed falls to a value E which is slightly above the lower limit of engine speed below which the reciprocating gas engine will stall. To prevent stalling, the dual electric machine 904 provides a torque assist at F and thereafter further assists the ramp at G as the reciprocating gas engine 904 seeks to reestablish the target engine speed. The torque assist terminates at step 1212 as the target engine speed is achieved and the control system switches the dual electric machine 904 into a neutral state.

Those of ordinary skill in the art will understand that the foregoing discussion teaches by way of example and not by limitation. Accordingly, what is shown and described may be subjected to insubstantial change without departing from the scope and spirit of invention. The inventors hereby state their intention to rely upon the Doctrine of Equivalents, if needed, in protecting their full rights in the invention.

We claim:

1. An oilfield hydraulic pumping system comprising:

a reciprocating gas engine having a first end and a second end, the reciprocating gas engine having an operating system that seeks to establish a constant operating speed when operating under different loads;

a hydraulic pump having a plurality of reciprocating pistons;

a driveline extending between the reciprocating gas engine and the hydraulic pump, the driveline including a transmission with a gear reduction system having a plurality of shiftable gears;

the driveline being constructed and arranged to receive torque emanating from the second end of the reciprocating gas engine, pass the torque through the gear reduction system to produce a modified torque, and deliver the modified torque to the hydraulic pump;

a dual electric machine operably mounted at the first end of the reciprocating gas engine, the dual electric machine being constructed and arranged to alter the torque emanating from the second end of the reciprocating gas engine; and control circuitry configured with programmatic instructions for operating the dual electric machine by determining an amount of additional torque to support an upshifting of gears in the transmission, and altering the torque emanating from the reciprocating gas engine to provide the amount of the additional torque in at least one mode selected from:

a first mode wherein prior to the upshifting of gears, the reciprocating gas engine is preloaded with a negative torque that operates against the torque emanating from the reciprocating gas engine so as to cause the reciprocating gas engine to exert the additional torque as the reciprocating gas engine seeks to maintain the constant operating speed, and a second mode wherein the amount of the additional torque is provided as a positive torque to assist the torque emanating from the reciprocating gas engine.

2. The oilfield hydraulic pumping system of claim 1, wherein the first mode ceases immediately upon the upshifting of gears.

3. The oilfield hydraulic pumping system of claim 1, wherein the mode commences immediately upon the upshifting of gears.

4. The oilfield hydraulic pumping system of claim 1, further comprising:

a second drive linkage connecting the reciprocating gas engine to the dual electric machine; and a control system provided with circuitry for switching the dual electric machine between a first state of operation providing electric current and a second state of operation providing a power assist to the reciprocating gas engine upon demand to mitigate an effect of transitional loading upon the engine speed or to provide additional power if required above a maximum output of the reciprocating engine.

5. The oilfield pumping system of claim 1, further comprising a gas pre-processing unit configured to treat field gas at a wellsite location for use as fuel by the reciprocating gas engine.

6. The oilfield hydraulic pumping system of claim 5, wherein the gas pre-processing unit includes a refrigeration unit.

7. The oilfield hydraulic pumping system of claim 5, wherein the gas pre-processing unit includes a compressor unit.

8. The oilfield hydraulic pumping system of claim 1, wherein the hydraulic pump is dedicated for use in hydraulic fracturing operations, the hydraulic pump being configured to receive frac fluids from a blending unit that is purpose-built for dedicated use in hydraulic fracturing operations.

9. A method of stimulating a well to increase production therefrom, the method comprising the steps of:

providing an oilfield pumping system according to claim 1, and operating the hydraulic pump in the first mode to move frac fluids in support of a hydraulic fracturing operation.

10. An oilfield hydraulic pumping system comprising:

a reciprocating gas engine having a first end and a second end, the reciprocating gas engine having an operating system that seeks to establish a constant operating speed when operating under different loads;

a hydraulic pump having a plurality of reciprocating pistons;

a driveline extending between the reciprocating gas engine and the hydraulic pump, the driveline including a transmission with a gear reduction system having a plurality of shiftable gears;

the driveline being constructed and arranged to receive torque emanating from the second end of the reciprocating gas engine, pass the torque through the gear reduction system to produce a modified torque, and deliver the modified torque to the hydraulic pump;

a dual electric machine operably is mounted within the driveline, the dual electric machine being constructed and arranged to alter the torque emanating from the second end of the reciprocating gas engine; and control circuitry configured with programmatic instructions for operating the dual electric machine by determining an amount of additional torque to support an upshifting of gears in the transmission, and altering the torque emanating from the reciprocating gas engine to provide the amount of the additional torque in a mode of prior to the upshifting of gears, the reciprocating gas engine is preloaded with a negative torque that operates against the torque emanating from the reciprocating gas engine so as to cause the reciprocating gas engine to exert the additional torque as the reciprocating gas engine seeks to maintain the constant operating speed.

11. The oilfield hydraulic pumping system of claim 10, wherein the mode ceases immediately upon the upshifting of gears.

12. An oilfield hydraulic pumping system comprising:

a reciprocating gas engine having a first end and a second end, the reciprocating gas engine having an operating system that seeks to establish a constant operating speed when operating under different loads;

a hydraulic pump having a plurality of reciprocating pistons;

a driveline extending between the reciprocating gas engine and the hydraulic pump, the driveline including a magnetic drive and a transmission with a gear reduction system having a plurality of shiftable gears;

the driveline being constructed and arranged to receive torque emanating from the second end of the reciprocating gas engine, pass the torque through the gear reduction system to produce a modified torque, and deliver the modified torque to the hydraulic pump;

a dual electric machine operably mounted at the first end of the reciprocating gas engine;

the dual electric machine being constructed and arranged to alter the torque emanating from the second end of the reciprocating gas engine; and control circuitry configured with programmatic instructions for operating the dual electric machine by determining an amount of additional torque to support an upshifting of gears in the transmission, and altering the torque emanating from the reciprocating gas engine to provide the amount of additional torque in at least one mode selected from the group consisting of:

(1) prior to the upshifting of gears, preloading the reciprocating gas engine with negative torque that operates against the torque emanating from the reciprocating gas engine so as to cause the reciprocating gas engine to exert additional torque as the reciprocating gas engine seeks to maintain the constant operating speed, and (2) providing the amount of additional torque as positive torque to assist the torque emanating from the reciprocating gas engine.

13. The oilfield hydraulic pumping system of claim 12, wherein the control system is configured to operate the magnetic drive with an amount of slippage that increases a range of operating speeds of the hydraulic pump.

* * * * *

UNITED STATES PATENT AND TRADEMARK OFFICE
CERTIFICATE OF CORRECTION

PATENT NO. : 12,486,748 B2
APPLICATION NO. : 18/307340
DATED : December 2, 2025
INVENTOR(S) : Roy Aune, Zack Thornton and Kirk Fiscus It is certified that error appears in the above-identified patent and that said Letters Patent is hereby corrected as shown below:

In the Specification
Column 5, Lines 17-18, change "up shifting" to --upshifting--

In the Claims
Column 21, Line 52, delete "is"

Signed and Sealed this
Twentieth Day of January, 2026

John A. Squires
*Director of the United States Patent and Trademark Office*